(12) United States Patent
Seo et al.

(10) Patent No.: US 9,538,518 B2
(45) Date of Patent: Jan. 3, 2017

(54) METHOD FOR DETECTING DOWNLINK CONTROL CHANNEL IN WIRELESS COMMUNICATION SYSTEM AND APPARATUS FOR SAME

(71) Applicant: LG ELECTRONICS INC., Seoul (KR)

(72) Inventors: Daewon Seo, Anyang-si (KR); Hanbyul Seo, Anyang-si (KR); Seungmin Lee, Anyang-si (KR); Jihyun Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/424,925

(22) PCT Filed: Aug. 16, 2013

(86) PCT No.: PCT/KR2013/007383
§ 371 (c)(1),
(2) Date: Feb. 27, 2015

(87) PCT Pub. No.: WO2014/035085
PCT Pub. Date: Mar. 6, 2014

(65) Prior Publication Data
US 2015/0208394 A1    Jul. 23, 2015

Related U.S. Application Data

(60) Provisional application No. 61/718,706, filed on Oct. 25, 2012, provisional application No. 61/694,230, (Continued)

(51) Int. Cl.
*H04W 72/04*    (2009.01)
*H04L 5/00*     (2006.01)

(52) U.S. Cl.
CPC .......... *H04W 72/042* (2013.01); *H04L 5/0053* (2013.01)

(58) Field of Classification Search
CPC ................................................. H04W 72/042
(Continued)

(56) References Cited

U.S. PATENT DOCUMENTS

2016/0014752 A1*  1/2016  Papasakellariou .. H04W 72/042
                                                    370/329

OTHER PUBLICATIONS

LG Electronics, "On EPDCCH search space monitoring", 3GPP TSG RAN WG1 Meeting #70, R1-123528, Aug. 13-17, 2012, pp. 1-4.
(Continued)

*Primary Examiner* — Ronald B Abelson
(74) *Attorney, Agent, or Firm* — Birch, Stewart, Kolasch & Birch, LLP

(57) ABSTRACT

The present invention relates to a wireless communication system, and more particularly, to a method for detecting a downlink control channel in a wireless communication system and to an apparatus for same. The method by which a terminal receives downlink control information in a wireless communication system, according to one example of the present invention, includes the steps of: receiving information elements, including information for setting a plurality of downlink subframe sets and information for representing a downlink control channel type for each of the plurality of downlink subframe sets, from a base station; determining the resource location to which the control is mapped in a specific downlink subframe set according to the type of the control channel; and monitoring a control channel corresponding to the control channel type at the resource location of the downlink subframe belonging to the specific downlink subframe set and receiving the downlink control information transmitted through the control channel.

14 Claims, 21 Drawing Sheets

(a)

(b)

Related U.S. Application Data filed on Aug. 28, 2012, provisional application No. 61/721,470, filed on Nov. 1, 2012.

(58) Field of Classification Search
USPC .................................................. 370/328, 329
See application file for complete search history.

(56) References Cited

OTHER PUBLICATIONS

LG Electronics, "On PHICH monitoring of EPDCCH-configured UEs", 3GPP TSG RAN WG1 Meeting #70, R1-123535, Aug. 13-17, 2012, pp. 1-3.
Samsung, "Issues on PHICH-less PUSCH HARQ operation in TDD CA", 3GPP TSG RAN WG1 #70, R1-123453, Aug. 13-17, 2012, pp. 1-5.
ZTE, "Consideration on UE monitoring set", 3GPP TSG RAN WG1 Meeting #68bis, R1-122107, May 21-25, 2012, pp. 1-4.
ZTE, "Consideration on UE monitoring set", 3GPP TSG RAN WG1 Meeting #70, R1-123375, Aug. 13-17, 2012, pp. 1-4.

* cited by examiner

METHOD FOR DETECTING DOWNLINK CONTROL CHANNEL IN WIRELESS COMMUNICATION SYSTEM AND APPARATUS FOR SAME

CROSS REFERENCE TO RELATED APPLICATIONS

This application is the National Phase of PCT International Application No. PCT/KR2013/007383, filed on Aug. 16, 2013, which claims priority under 35 U.S.C. 119(e) to U.S. Provisional Application No. 61/694,230, filed on Aug. 28, 2012, 61/718,706 filed on Oct. 25, 2012 and 61/721,470 filed on Nov. 1, 2012, all of which are hereby expressly incorporated by reference into the present application.

TECHNICAL FIELD

The following description relates to a wireless communication system, and more particularly, to a method of detecting a downlink control channel and an apparatus therefor.

BACKGROUND ART

A user equipment detects a downlink control channel (e.g., PDCCH (physical downlink control channel)) carrying scheduling information on downlink data transmission and may be then able to receive downlink data from a base station. In a legacy wireless communication system, a position of a downlink resource to which the downlink control channel is mapped can be inferred from different control information (e.g., CFI (control format indicator)). Hence, a user equipment can monitor the downlink control channel on the position of the downlink resource. And, a legacy downlink control channel can be demodulated based on a channel, which is estimated based on a cell-specifically transmitted reference signal.

Meanwhile, an enhanced physical downlink control channel (e.g., EPDCCH (enhanced PDCCH)) can be used in an improved wireless communication system. The EPDCCH is configured to be transmitted in a resource position differentiated from a resource position in which PDCCH is transmitted and the EPDCCH can be transmitted based on a DM RS (demodulation reference signal) instead of a cell-specific reference signal.

A user equipment operating in an improved wireless communication system can received both PDCCH and EPDCCH. To this end, it is necessary to provide the user equipment with information on a downlink control channel (PDCCH or EPDCCH), which is monitored by the user equipment in a downlink subframe. In case of monitoring EPDCCH, it is necessary to provide the user equipment with information on a resource position used for monitoring the EPDCCH. Moreover, in case of monitoring EPDCCH, it is necessary to clearly determine whether the user equipment monitors a physical HARQ (hybrid automatic repeat request) indicator channel (PHICH) which is transmitted in a PDCCH mapping area.

According to operations of a currently defined wireless communication system, it is necessary to have a method of efficiently configuring a type of a downlink control channel monitored by a user equipment and information on a resource position to which a downlink control channel is mapped in a manner of combining the type and the information with each other. And, when a user equipment monitors EPDCCH, it is necessary to have a method of clearly determining whether the user equipment monitors PHICH.

DISCLOSURE OF THE INVENTION

Technical Task

Accordingly, one object of the present invention is to provide a method of efficiently signaling information on a downlink control channel monitored by a user equipment by minimizing and integrating overhead of the information. And, another object of the present invention is to provide a method of clearly determining whether to monitor a confirmation response channel (e.g., PHICH) transmitted in a PDCCH area.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving downlink control information at a user equipment in a wireless communication system, includes receiving an information element including information setting a plurality of downlink subframe sets and information indicating a type of a downlink control channel for each of a plurality of the downlink subframe sets from a base station, determining a resource position to which the control channel is mapped according to the type of the control channel in, a specific downlink subframe set, and monitoring a control channel corresponding to the type of the control channel in the resource position of a downlink subframe belonging to the specific downlink subframe set and receiving the downlink control information transmitted on the control channel.

To further achieve these and other advantages and in accordance with the purpose of the present invention, according to a different embodiment, a user equipment receiving downlink control information in a wireless communication system includes a transmission module, a reception module, and a processor, the processor configured to receive an information element including information setting a plurality of downlink subframe sets and information indicating a type of a downlink control channel for each of a plurality of the downlink subframe sets from a base station using the reception module, the processor configured to determine a resource position to which the control channel is mapped according to the type of the control channel in a specific downlink subframe set, the processor configured to monitor a control channel corresponding to the type of the control channel in the resource position of a downlink subframe belonging to the specific downlink subframe set and receive the downlink control information transmitted on the control channel using the reception module.

Following items can be commonly applied to embodiments according to the present invention.

The information indicating the type of the downlink control channel can indicate one of PDCCH (physical downlink control channel) and EPDCCH (enhanced PDCCH).

The information element can further include information indicating the resource position to which the control channel is mapped.

The information indicating the resource position to which the control channel is mapped may correspond to information indicating a start OFDM (orthogonal frequency division multiplexing) symbol position of EPDCCH.

The resource position to which the control channel is mapped can be inferred from CFI information transmitted on PCFICH (physical control format indicator channel).

If the type of the downlink control channel for the specific downlink subframe set indicates PDCCH, the information element may not include information indicating a resource position to which the control channel is mapped.

If the type of the downlink control channel for the specific downlink subframe set indicates EPDCCH and the resource position to which the control channel is mapped is overlapped with a PDCCH area, PHICH (physical hybrid automatic repeat request indicator channel) monitoring monitored by the user equipment may not be performed.

If information indicating a start OFDM symbol position of EPDCCH is included in the information element, PHICH monitoring monitored by the user equipment may not be performed.

When information indicating start OFDM symbol positions of a plurality of EPDCCHs is included in the information element, if at least one of the start OFDM symbol positions of a plurality of the EPDCCHs is overlapped with a PDCCH area, PHICH monitoring monitored by the user equipment may not be performed.

When the type of the downlink control channel for the specific downlink subframe set indicates EPDCCH and the resource position to which the control channel is mapped is overlapped with a PDCCH area, if a DMRS (demodulation reference signal) antenna port used for demodulating the EPDCCH and a serving cell CRS (cell-specific reference signal) antenna port are indicated as QCL (Quansi Co-Located), PHICH monitoring monitored by the user equipment may not be performed.

When the type of the downlink control channel for the specific downlink subframe set indicates EPDCCH and the resource position to which the control channel is mapped is overlapped with a PDCCH area, if a DMRS (demodulation reference signal) antenna port used for demodulating the EPDCCH and a serving cell CRS (cell-specific reference signal) antenna port are indicated as non-QCL (Quansi. Co-Located), PHICH monitoring monitored by the user equipment can be performed.

The PDCCH area can be inferred based on at least one of CFI information transmitted on PCFICH and PHICH duration information.

A plurality of the downlink subframe sets can be configured based on at least one selected from the group consisting of a CP (cyclic prefix) type of a subframe, whether a subframe corresponds to an MBSFN (multicast broadcast single frequency network) subframe, whether a subframe corresponds to a special subframe in TDD (time division duplex), the type of the downlink control channel, whether EPDCCH is transmittable, and a start OFDM symbol position of EPDCCH.

The information element can be provided to the user equipment via RRC (radio resource control) signaling.

It is to be understood that both the foregoing general description and the following detailed description are exemplary and explanatory, and are intended to provide further explanation of the invention as claimed.

Advantageous Effects

According to the present invention, it is able to provide a method of efficiently signaling information on a downlink control channel monitored by a user equipment by minimizing and integrating overhead of the information. And, it is able to provide a method of clearly determining whether to monitor a confirmation response channel (e.g., PHICH) transmitted in a PDCCH area.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
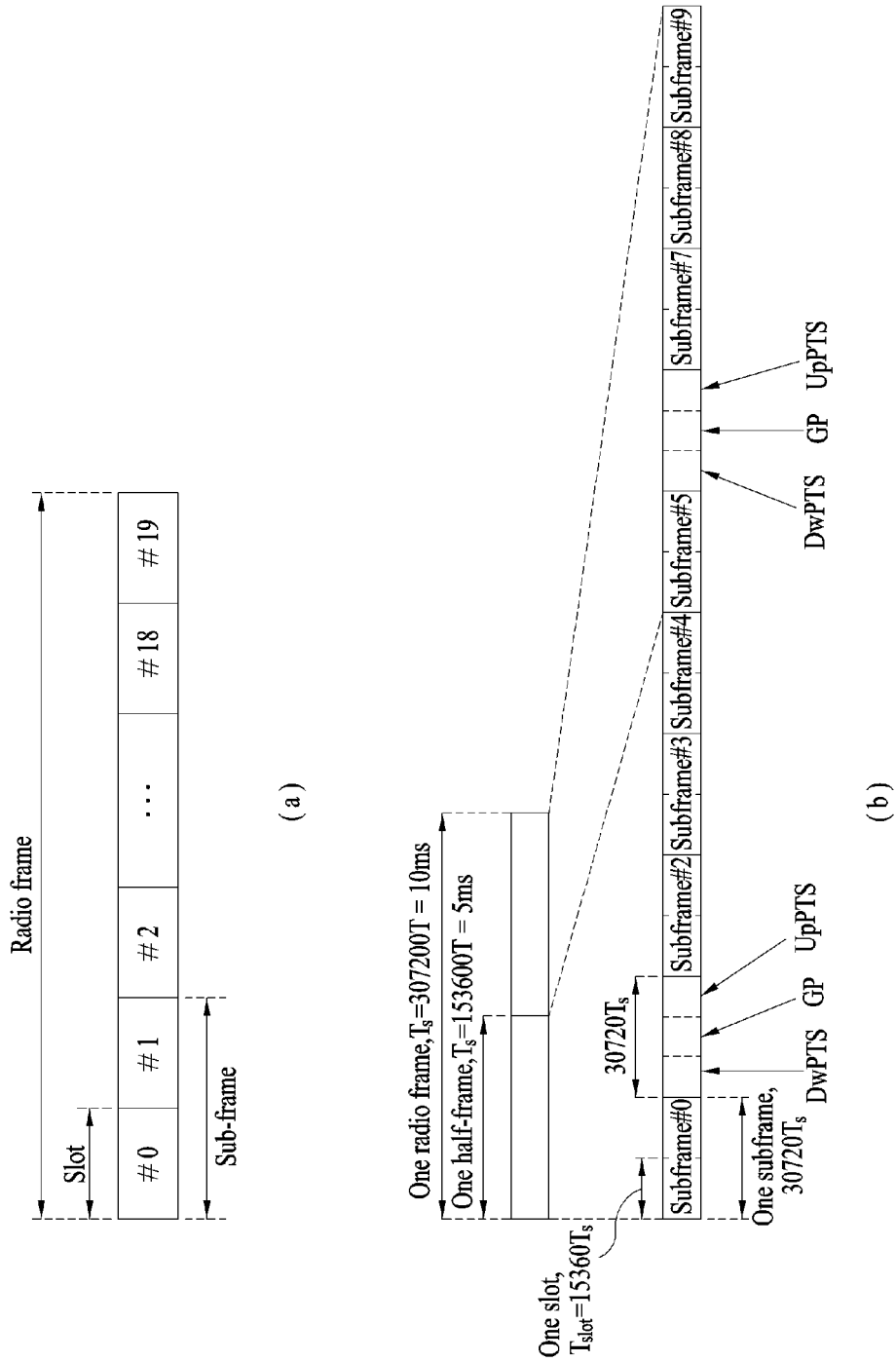
FIG. 1 is a diagram for explaining a structure of a radio frame.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LIE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LIE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

Radio Frame Structure

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 (a) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

FIG. 1 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. A subframe including DwPTS, GP and UpPTS is referred to as a Special Subframe. The DwPTS is used for initial cell search, synchronization, or a channel estimation, in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
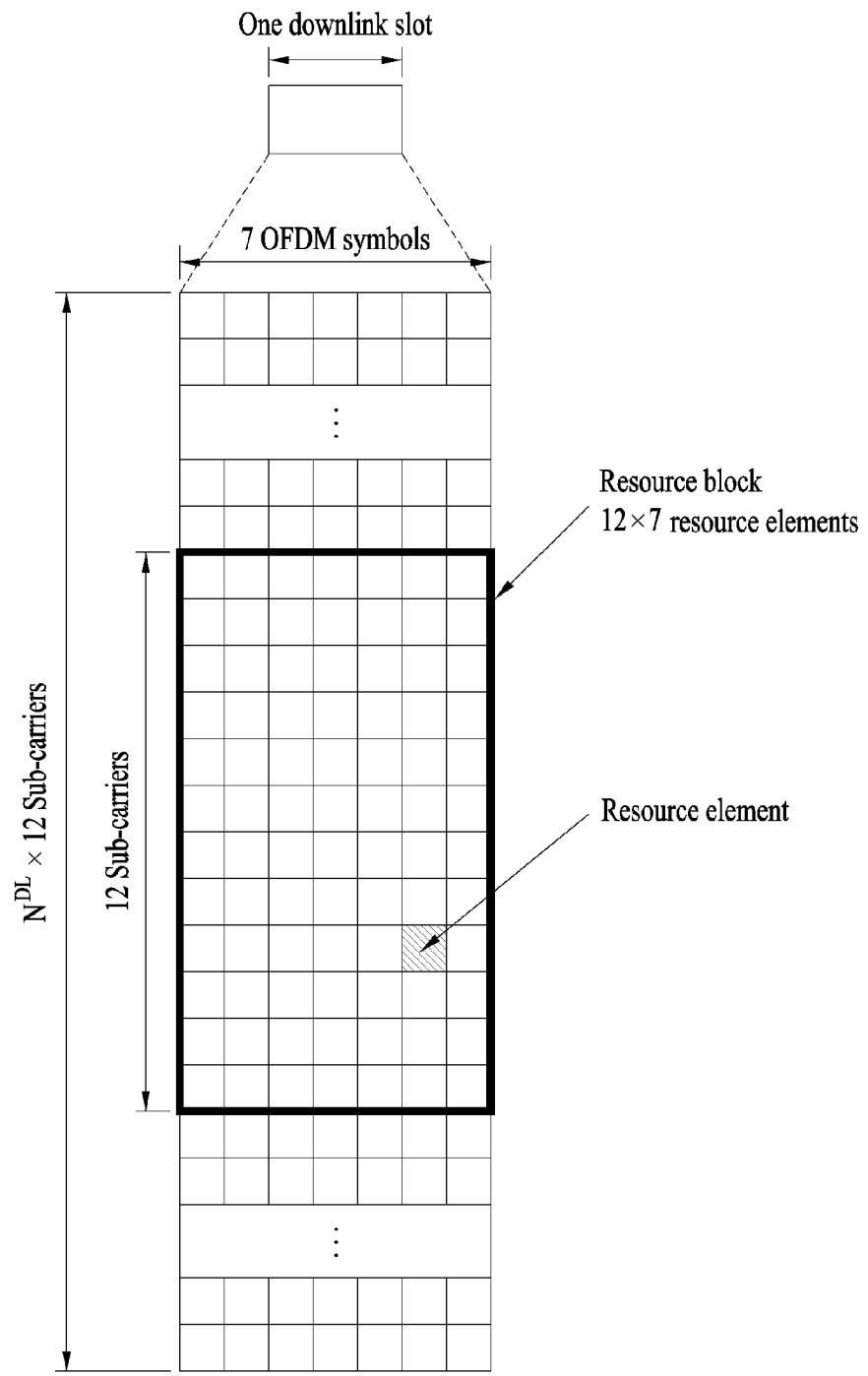
FIG. 2 is a diagram for a resource grid.

FIG. 2 is a diagram for a resource grid in a downlink slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Downlink Subframe Structure

Figure 3:
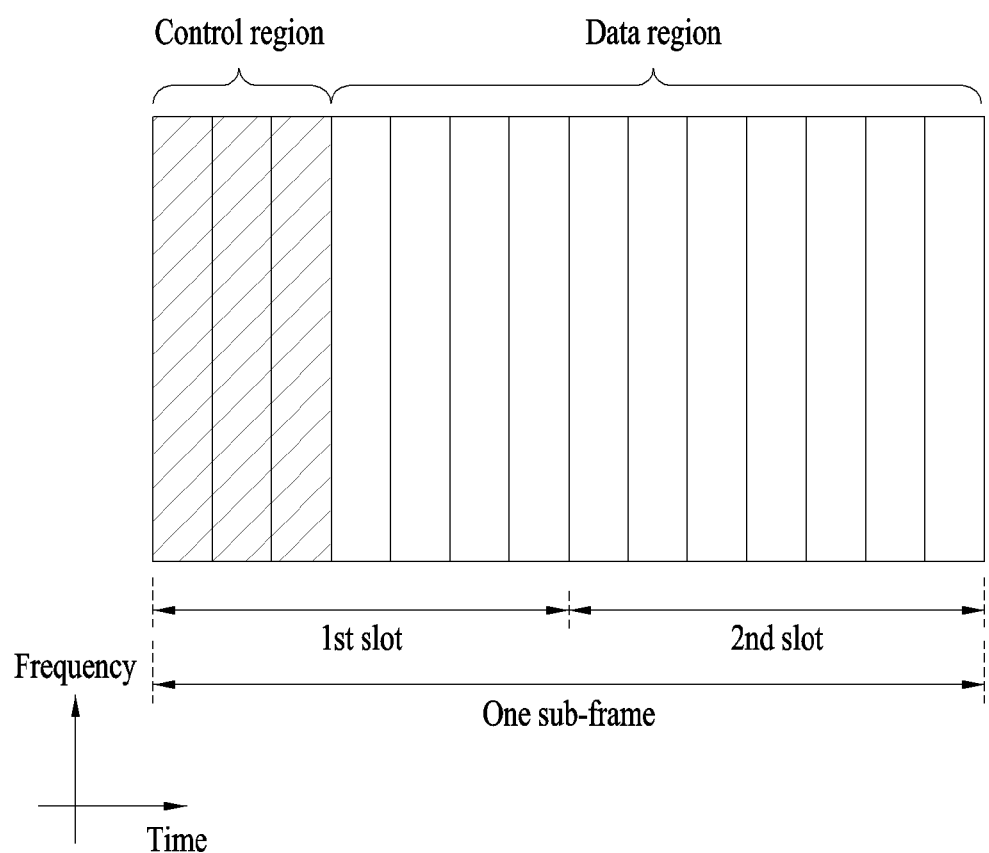
FIG. 3 is a diagram for a structure of a downlink subframe.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group.

PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user, equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Resource Mapping of Downlink Control Channel

As a region for transmitting a downlink control channel, 1 to 3 OFDM symbols are mapped to downlink control channel in accordance with overhead of the downlink control channel (up to 4 OFDM symbols are available, in case downlink system bandwidth is configured as narrow). In order to adjust the number of OFDM symbols for a downlink control channel in each subframe, it may be able to use PCFICH. And, it is able to use PHICH to provide an HARQ acknowledgment response [ACK/NACK (acknowledgement/negative-acknowledgement)] to an uplink transmission in downlink. Moreover, it is able to use PDCCH to transmit control information for a downlink or uplink data transmission.

Figure 4:
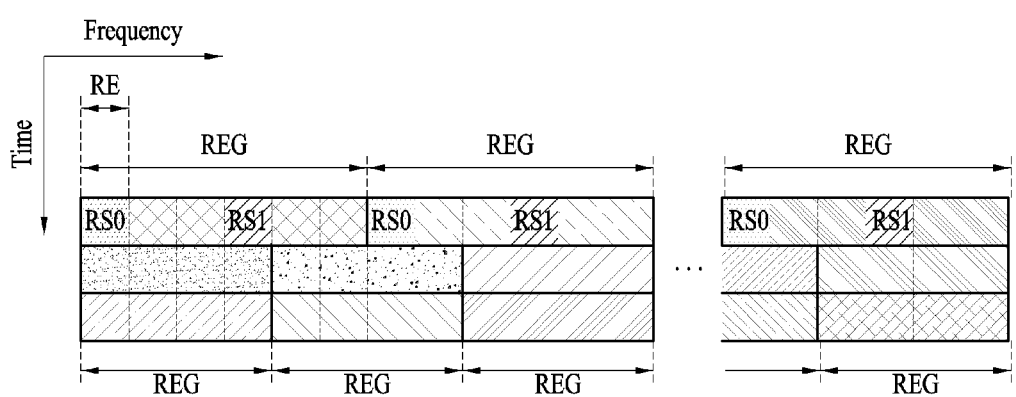
FIGS. 4 and 5 are diagrams for explaining a resource element group.
Figure 5:
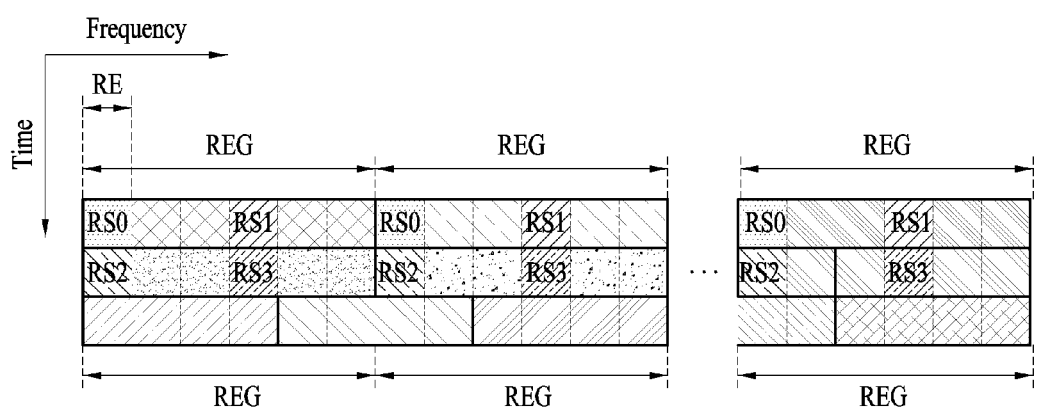

FIG. 4 and FIG. 5 show that the above-configured downlink control channels are assigned by resource element group (REG) unit in a control region of each subframe. FIG. 4 relates to a system having 1- or 2 cell-specific antenna port and FIG. 5 relates to a system having 4-cell-specific antenna port. Referring to FIG. 4 and FIG. 5, REG corresponding to a basic resource unit for assigning a control channel is configured with 4 contiguous REs in frequency domain except a resource element for assigning a reference signal (for example, cell-specific reference signal (CRS)). A specific number of REGs are available for a transmission of a downlink control channel in accordance with overhead of the downlink control channel.

PCFICH (Physical Control Format Indicator Channel)

In order to provide resource allocation information for specific subframe, it is able to transmit PDCCH between OFDM symbol indexes 0 to 3. The number of OFDM symbols used for a control channel is changeable for each subframe. And, information on the OFDM symbol number may be provided via PCFICH. Hence, the PCFICH should be transmitted in every subframe.

Control Format Information (CFI) can be provided through the PCFICH. 'CFI=1' indicates that PDCCH is transmitted on OFDM symbol index 0, 'CFI=2' indicates that PDCCH is transmitted on OFDM symbol indexes 0 and and 1, and 'CFI=3' indicates that PDCCH is transmitted on OFDM symbol indexes 0 to 2. In this case, 'CFI=4' is reserved.

Information carried on PCFICH may be defined different in accordance with a system bandwidth. For instance, in case that a bandwidth of a system is smaller than a specific threshold (for example, 10 RB), 'CFI=1' may indicate that 2 OFDM symbols are used for PDCCH. 'CFI=2' may indicate that 3 OFDM symbols are used for PDCCH. And, 'CFI=3' may indicate that 4 OFDM symbols are used for PDCCH.

Figure 6:
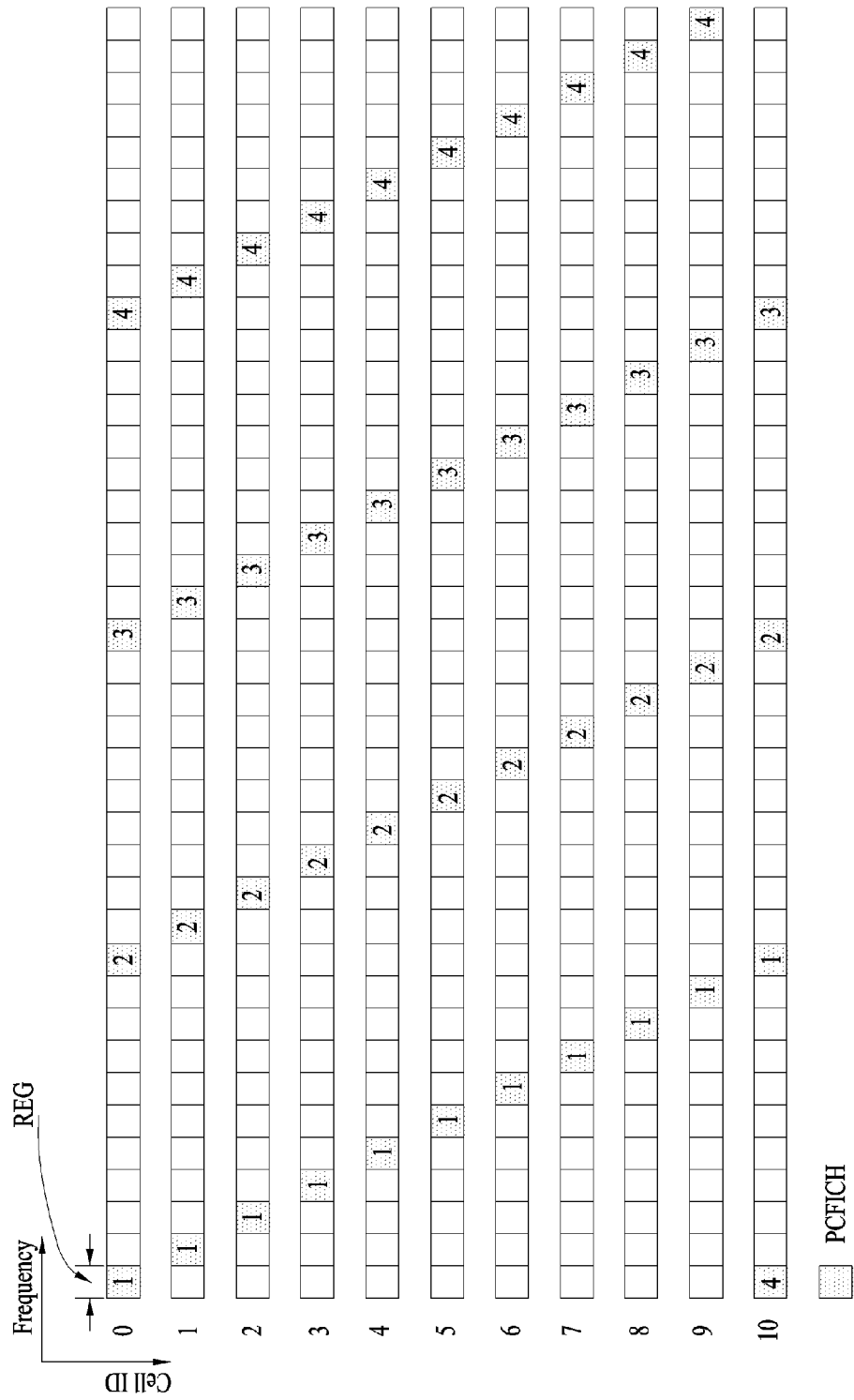
FIG. 6 is a diagram for explaining a scheme of transmitting PCFICH.

FIG. 6 is a diagram for a scheme of transmitting PCIFCH. REG shown in FIG. 6 is configured with 4 subcarriers, and more particularly, with subcarriers except RS (reference signal). A position of the REG may be frequency-shifted per cell (i.e., in accordance with a cell identifier) not to cause interference between cells. Additionally, PCFICH is always transmitted on a 1st OFDM symbol (i.e., OFDM symbol index 0) of a subframe. Hence, when a receiving end receives a subframe, the receiving end acquires the number of OFDM symbols for carrying PDCCH by checking information of PCFICH and is then able to receive control information transmitted on the PDCCH.

PHICH (Physical Hybrid-ARQ Indicator Channel)

Figure 7:
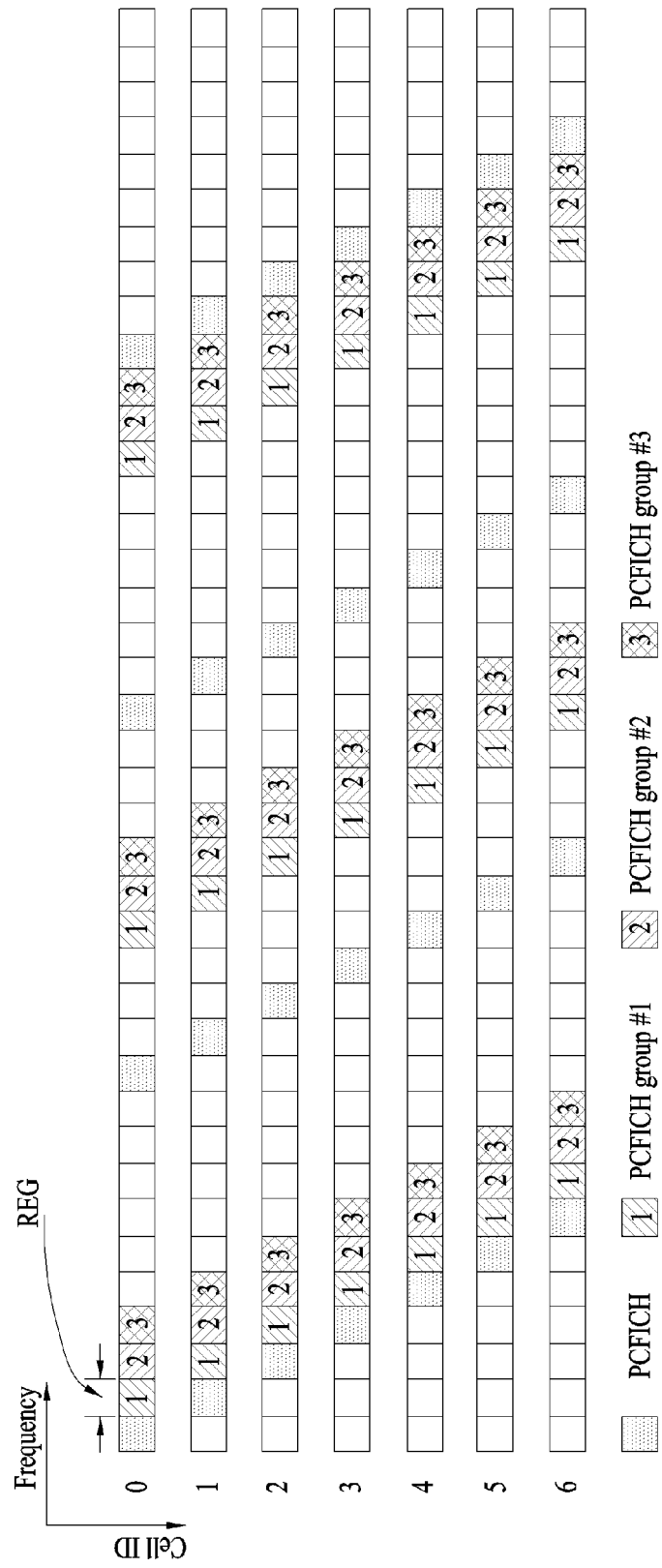
FIG. 7 is a diagram for an example of a position of PCFICH and a position of PHICH.

FIG. 7 is a diagram to illustrate positions of PCFICH and PHICH generally applied for a specific bandwidth: HARQ ACK/NACK information on an uplink data transmission is transmitted on PHICH. Several PHICH groups are created in a single subframe and several PHICHs exist in a single PHICH group. Hence, PHICH channels for several user equipments are included in the single PHICH group.

Referring to FIG. 7, PHICH assignment for each user equipment in several PHICH groups are performed using a lowest PRB (physical resource block) index of PUSCH resource allocation and a cyclic shift index for an uplink demodulation reference signal (DMRS) transmitted on a UL (uplink) grant PDCCH. In this case, the uplink DMRS is a UL reference signal and is the signal provided together with UL transmission for channel estimation, for demodulation of UL data. Moreover, PHICH resource is known through such an index pair as ($n_{PHICH}^{group}$, $n_{PHICH}^{seq}$). In ($n_{PHICH}^{group}$, $n_{PHICH}^{seq}$), $n_{PHICH}^{group}$ means a PHICH group number) and $n_{PHICH}^{seq}$ means an orthogonal sequence index in the corresponding PHICH group. $n_{PHICH}^{group}$ and $n_{PHICH}^{seq}$ is defined as Equation 1.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

[Equation 1]

In Equation 1, $n_{DMRS}$ indicates a cyclic shift of DMRS used for a PHICH associated UL transmission. $n_{DMRS}$ is mapped to a value of 'cyclic shift for DMRS' field of the latest uplink grant control information (for example, DCI format 0 or 4) for Transport Block (TB) associated with corresponding PUSCH transmission. For example, 'cyclic shift for DMRS' filed of the latest uplink grant information may have 3 bit size. If the field indicates '000', $n_{DMRS}$ may configured to indicate '0' value.

In Equation 1, $N_{SF}^{PHICH}$ indicates a spreading factor size used for PHICH modulation, $I_{PRB\_RA}^{lowest\_index}$ indicates in a lowest PRB index of a first slot of corresponding PUSCH transmission. $I_{PHICH}$ indicates '1' value only if special case (if configured as UL/DL configuration 0 and if PUSCH transmission exists in subframe n=4 or 9) in TDD system, if else $i_{PHICH}$ indicates '0' value. $N_{PHICH}^{group}$ indicates the number of PHICH group configured by higher layer, may be defined as equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

[Equation 2]

$N_g$ indicates an amount of PHICH resource transmitted on PBCH (Physical Broadcast Channel) and $N_g$ is represented as $N_g \in \{1/6, 1/2, 1, 2\}$ in 2-bit size. In Equation 2, $N_{RB}^{DL}$ indicates the number of resource block configured for downlink.

Figure 8:
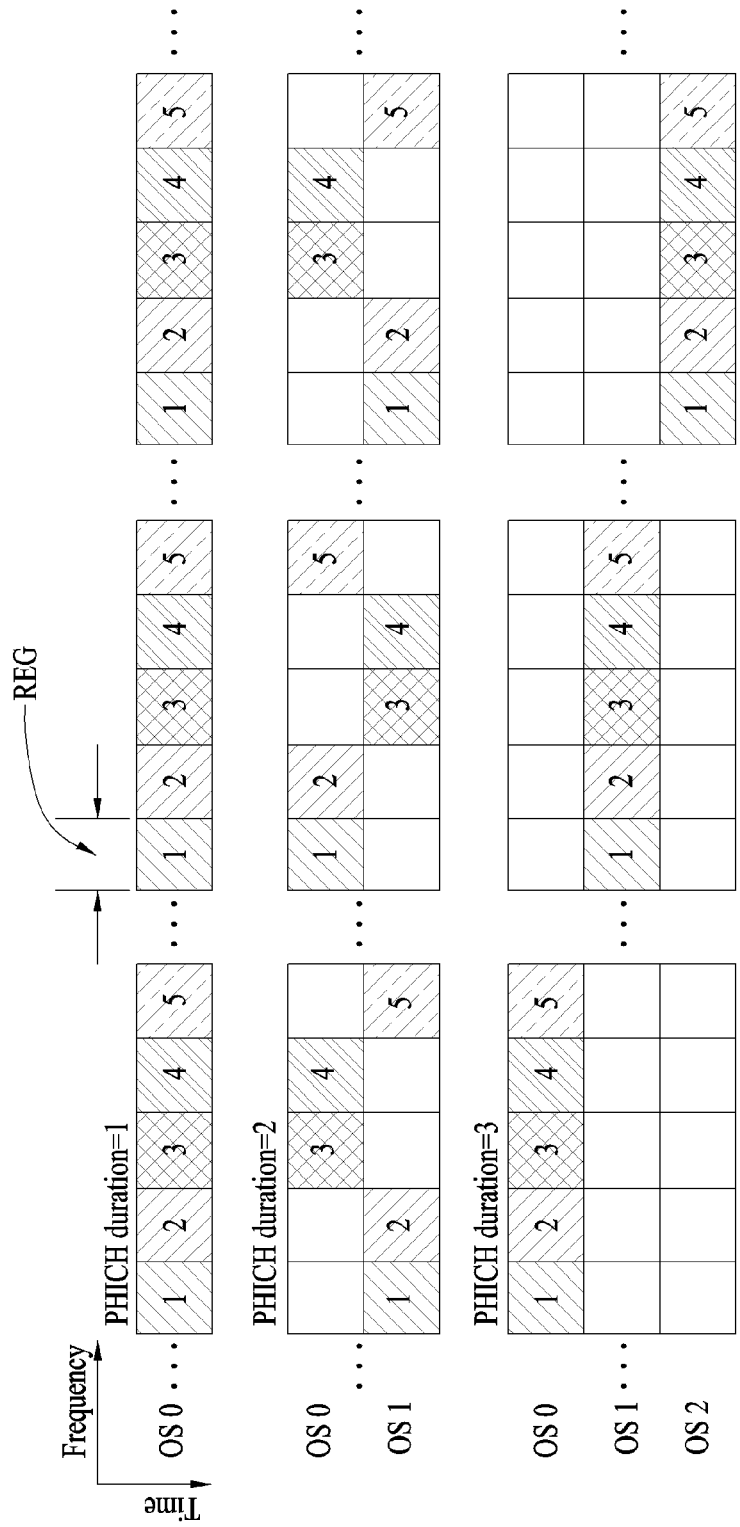
FIG. 8 is a diagram for a downlink resource element position to which a PHICH group is mapped.

FIG. 8 is a diagram to illustrate a position of a downlink (DL) resource element having PHICH group mapped thereto. Referring to FIG. 8, PHICH group may be configured in different time region (i.e., a different OS (OFDM symbol)) within a single subframe.

PDCCH Processing

When PDCCHs are mapped to REs, control channel elements (CCEs) corresponding to contiguous logical allocation units are used. A CCE includes a plurality of (e.g. 9) REGs and an REG includes 4 neighboring REs except for a reference signal (RS).

The number of CCEs necessary for a specific PDCCH depends on a DCI payload corresponding to control information size, cell bandwidth, channel coding rate, etc. Specifically, the number of CCEs for a specific PDCCH can be determined based on PDCCH format shown in Table 1.

TABLE 1

| PDCCH format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

While one of the above-mentioned four PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 2.

TABLE 2

| | Search space | | The number of PDCCH candidates |
| --- | --- | --- | --- |
| | Aggregation level | Size (CCE unit) | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, the UE has a plurality of search spaces at each aggregation level because 4 aggregation levels are present. The search spaces may be divided into a UE-specific search space (USS) and a common search space (CSS), as shown in Table 2. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs need to receive PDCCHs, for system information dynamic scheduling or paging messages, for example. The common search space may be used for a specific UE for resource management. Furthermore, the common search space may overlap with the UE-specific search space.

The UE attempts to decode a search space, as described above. The number of decoding attempts is determined by DCI format and transmission mode determined through RRC signaling. When carrier aggregation (CA) is not applied, the UE needs to perform a maximum of 12 decoding attempts because 2 DCI sizes (DCI format 0/1A/3/3A and DCI format 1C) have to be considered for each of 6 PDCCH candidates for a common search space. For a UE-specific search space, 2 DCI sizes are considered for (6+6+2+2=16) PDCCH candidates and thus a maximum of 32 decoding attempts is needed. Accordingly, a maximum of 44 decoding attempts needs to be performed when carrier aggregation (CA) is not applied.

Enhanced Control Channel (E-PDCCH)

Enhanced-PDCCH (E-PDCCH) will hereinafter be described as a representative example of an enhanced control channel.

While control information included in the above-described DCI formats is transmitted through a PDCCH defined in LTE/LTE-A in the above description, the control information can also be transmitted through a downlink control channel other than the PDCCH, for example, an enhanced PDCCH (E-PDCCH). The E-PDCCH is an extended form of a control channel carrying DCI for a UE and may be used to effectively support inter-cell interference control (ICIC), CoMP, MU-MIMO, etc.

The E-PDCCH is discriminated from the PDCCH in that the e-PDCCH and R-PDCCH are allocated to time-frequency resource regions (e.g., a data region of FIG. 3) other than regions (e.g., a control region of FIG. 3) defined for PDCCH transmission in LTE-LTE-A. In order to discriminate between a conventional PDCCH and E-PDCCH, the conventional PDCCH is referred to as a legacy PDCCH. For example, resource element (RE) mapping of E-PDCCH may indicate that REs of E-PDCCH are mapped to the remaining OFDM symbols other than initial N OFDM symbols (e.g., N≤4) of a downlink subframe in a time domain, and are also mapped to a set of semi-statically allocated resource blocks (RBs) in a frequency domain.

Similar to the reason of E-PDCCH introduction, E-PHICH may be defined as a new control channel carrying HARQ ACK/NACK information regarding uplink (UL) transmission, and E-PCFICH may be defined as a new control channel carrying information of a resource region used for transmission of a DI control channel. E-PDCCH, E-PHICH and/or E-PCFICH may be commonly referred to as enhanced control channel(s).

Enhanced REG (EREG) may be used to define the Enhanced-control channel(s)-to-RE(s) mapping operation. For example, 16 EREGs (i.e., EREG 0 to EREG 15) may be present in one PRB pair. The remaining REs'other than REs that are mapped to demodulation reference signal (DMRS) on a single PRB are numbered from 0 to 15. The numbering order may first be based on the frequency increasing order, and then based on the time increasing order. For example, REs indexed with may construct One EREG i.

Enhanced control channel (e.g., E-PDCCH) may be transmitted using an aggregation of one or more enhanced CCEs (ECCEs). Each ECCE may include one or more EREGs. The number of EREGs per ECCE may be, for example, 4 or 8. In case of a normal subframe of a normal CP, the number of EREGs per ECCE may be set to 4.

ECCEs available in E-PDCCH may be numbered from 0 to $N_{ECCE}$-1. For example, $N_{ECCE}$ may be set to 1, 2, 4, 8, 16 or 32.

The number of REs of a PRB pair configured to transmit the E-PDCCH may be defined as the number of RES satisfying the following conditions i), ii) and iii). The first condition (i) is that REs should be a part of one of 16 EREGs of a PRB pair. The second condition (ii) is that REs need not be used for Cell-specific Reference Signal (CRS) or Channel State Information Reference Signal (CSI-RS). The third condition (iii) is that REs need to belong to OFDM symbols having an index higher than that of a start OFDM symbol at which E-PDCCH starts.

In addition, E-PDCCH may be mapped to REs in different ways according to the localized scheme and the distributed scheme. E-PDCCH may be mapped to REs configured to satisfy the following conditions a) to d). The first condition (a) means that REs should be a part of EREG allocated for transmission. The second condition (b) means that REs should not be a part of a PRB pair used to transmit a PBCH (Physical Broadcast Channel) or synchronization signal. The third condition (c) means that REs need not be used for CRS or CSI-RS of a specific UE. The fourth condition (d) means that REs should belong to OFDM symbols having an index higher than that of a start OFDM symbol at which E-PDCCH starts.

E-PDCCH allocation may be carried out as follows. One or more E-PDCCH-PRB sets may be established for a UE through layer signaling from a BS or eNB. For example, the E-PDCCH-PRB set for use in the case of E-PDCCH may be used to monitor the E-PDCCH.

In addition, cross interleaving may or may not be applied to RE mapping of the E-PDCCH.

If cross interleaving is not applied, one E-PDCCCH may be mapped to a specific set of RBs, and the number of RBs constructing the RB set may correspond to an aggregation level 1, 2, 4 or 8. In addition, other E-PDCCH may not be transmitted through the corresponding RB set.

If cross interleaving is applied, plural E-PDCCHs are simultaneously multiplexed and interleaved, the E-PDCCHs may be mapped to RBs allocated for transmission of the E-PDCCH. That is, the above-mentioned E-PDCCH-to-RB mapping may also indicate that plural E-PDCCHs are simultaneously mapped to a specific RB set.

DCI Format 1A

DCI format 1A may refer to a DCI format used for compact scheduling of one PDSCH codeword within one cell. In other words, DCI format 1A may include a variety of control information used in single-antenna transmission, single-stream transmission, or Tx diversity transmission, etc. Table 3 shows an example of DCI format 1A defined in 3GPP LTE/LTE-A.

TABLE 3

| | |
|---|---|
| Carrier Indicator | 0 or 3 bits |
| Flag for format 0/format 1A differentiation | 1 bit |
| Localized/Distributed VRB assignment Flag | 1 bit |
| Resource Block Assignment | N bits |
| Modulation and coding scheme | 5 bits |
| HARQ process number | 3 bits(FDD), 4 bits(TDD) |
| New Data Indicator | 1 bit |
| Redundancy Version | 2 bits |
| TPC(Transmit Power Control) command for PUCCH | 2 bits |
| Downlink Assignment Index | 0 bit(FDD), 2 bits(TDD) |
| SRS(Sounding Reference Signal) request | 0 or 1 bit |

DCI format 1A including control information of Table 3 may be transferred from a BS (or eNB) to a UE through PDCCH or E-PDCCH.

DCI format 1A includes information that is capable of scheduling the most basic downlink transmission (i.e., one PDSCH codeword transmission at Rank 1). Accordingly, if a complicated PDSCH transmission scheme, such as transmission of at least Rank-2 and/or transmission of multiple codewords, is incorrectly performed, DCI format 1A may be used to support the most basic PDSCH transmission scheme (i.e., a fallback usage).

Uplink (UL) Subframe Structure

Figure 9:
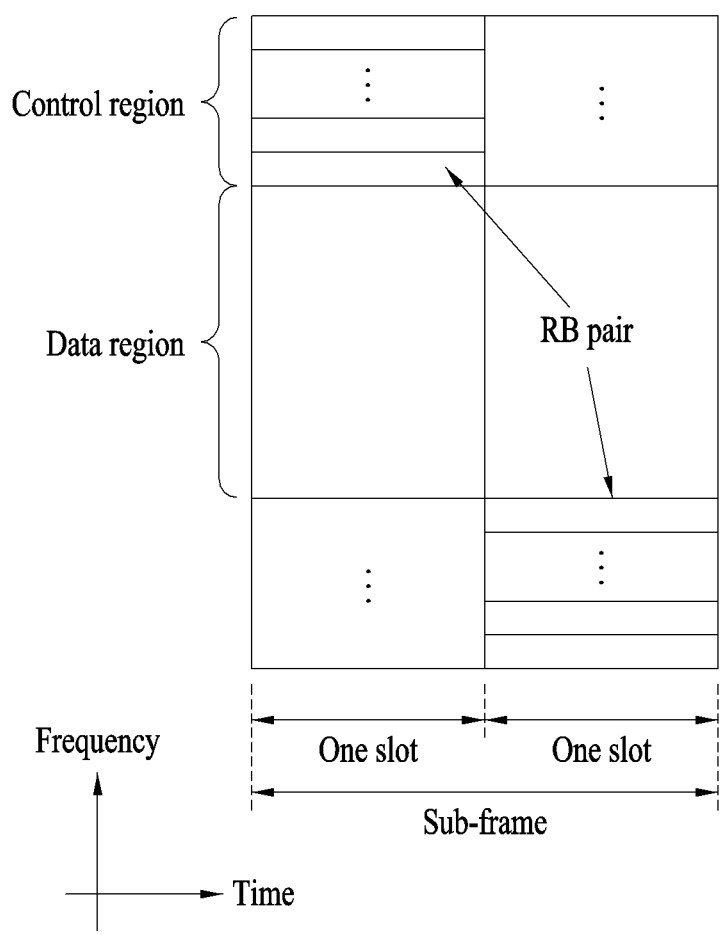
FIG. 9 is a diagram for a structure of an uplink subframe.

FIG. 9 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PDCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of Which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive, the signal. Accordingly, each transmission antenna has an individual RS. In more detail, a RS should be transmitted through each Tx antenna port.

A downlink RS includes a Common RS (CRS) shared among all UEs in a cell and a Dedicated RS (DRS) for only a specific-UE. It is possible to provide information for channel estimation and demodulation using such-RSs.

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be also be called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

Figure 10:
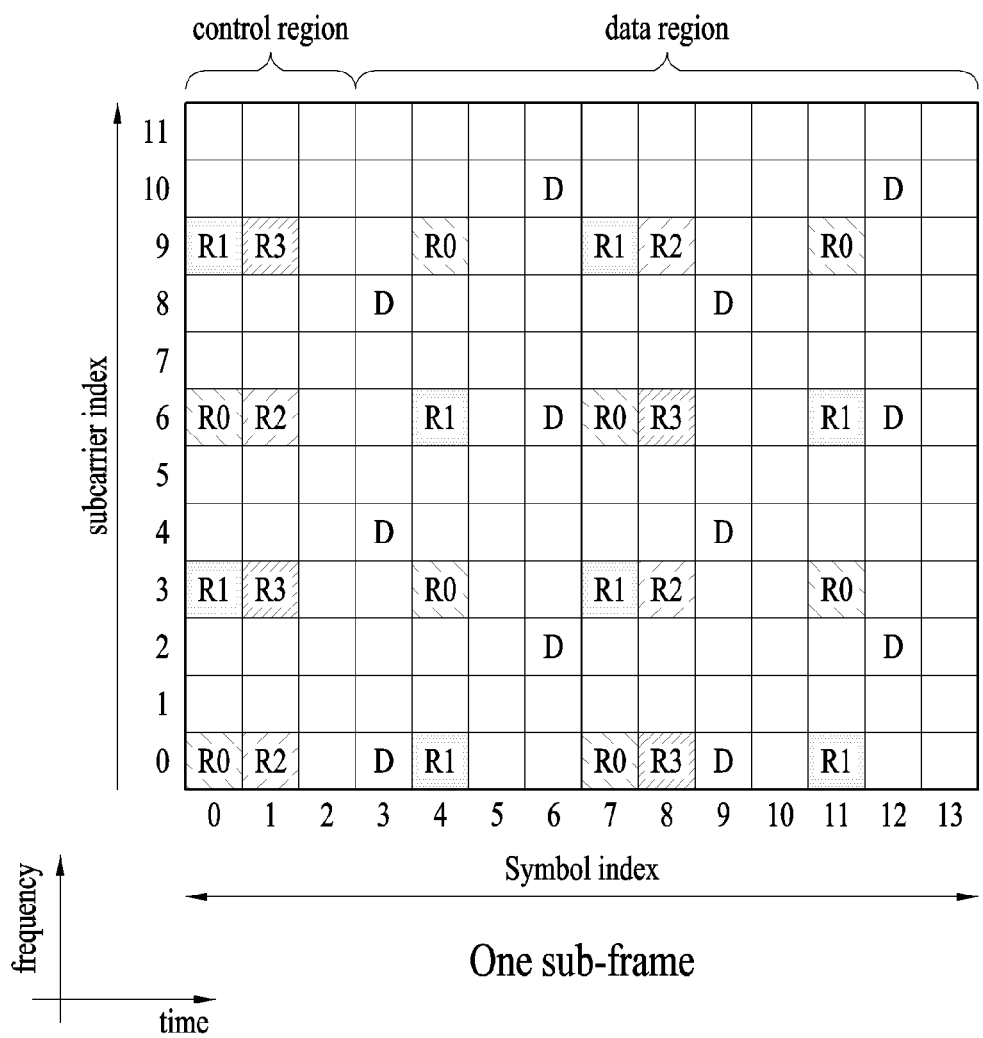
FIG. 10 is a diagram for a pattern to which a cell-specific reference signal and a UE-specific reference signal are mapped.

FIG. 10 is a diagram showing a pattern of Cell-Specific Reference Signals (CRSs) and UE-specific Reference Signals (or DMRSs) mapped on a downlink RB pair defined in the existing 3GPP LTE system (e.g., Release-8). The downlink RB pair as a mapping unit of the RSs may be expressed in units of one subfame on a time domain×12 subcarriers on a frequency domain. That is, on the time axis, one RB pair has a length of 14 OFDM symbols in case of the normal CP and has a length of 12 OFDM symbols in case of the extended CP. FIG. 10 shows a pair of RBs in case of a normal CP.

FIG. 10 shows the locations of the RSs on the RB pair in the system in which the eNodeB supports four transmission antennas. In FIG. 10, Resource Elements (REs) denoted by "R0", "R1", "R2" and "R3" indicate the locations of the CRSs of the antenna port indexes 0, 1, 2 and 3, respectively. In FIG. 10, the RE denoted by "D" indicates the location of the DRS.

Hereinafter, the CRS will be described in detail.

The CRS is used to estimate the channel of a physical antenna and is distributed over the entire band as an RS which is able to be commonly received by all as located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 3.

$$k = 6m + (v + v_{shift}) \bmod 6 \quad \text{[Equation 3]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 3, k denotes a subcarrier index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID, mod indicates a modulo operation. The location of the RS in the frequency domain depends on a value $V_{shift}$. Since the value $V_{shif}$ depends on the cell ID, the location of the RS has a frequency shift value which varies according to the cell.

More specifically, in order to increase channel estimation performance through the CRSs, the locations of the CRSs in the frequency domain may be shifted so as to be changed according to the cells. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing (stealing) the powers of the REs except for the RES allocated far the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for antenna ports 0 and 1 are located on the symbol indexes 0 and 4 (the symbol indexes 0 and 3 in case of the extended CP) of the slot and the RSs for antenna ports 2 and 3 are located on the symbol index 1 of slot. The frequency locations of the RSs for the antenna ports 2 and 3 in the frequency domain are exchanged with each other in a second slot.

Hereinafter, the DMRS will be described in detail.

The DMRS (or the UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equation 4. Equation 4 is for the normal CP and Equation 4 is for the extended CP.

$$k = (k') \bmod N_{sc}^{RB} + N_{sc}^{RB} \cdot n_{PRB}$$ [Equation 4]

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

-continued $$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

In Equation 4, k denotes a subcarrier index, l denotes a symbol index, and p denotes an antenna port index. $N_{SC}^{RB}$ denotes the resource block size in the frequency domain and is expressed by the number of subcarriers. $n_{PRB}$ denotes a physical resource block number. $N_{RB}^{PDSCH}$ denotes the bandwidth of the RB of the PDSCH transmission. $n_s$ denotes a slot index, and $N_{ID}^{cell}$ denotes a cell ID. mod indicates a modulo operation. The location of the RS in the frequency domain depends on a value $V_{shift}$. Since the value $V_{shif}$ depends on the cell ID, the location of the RS has a frequency shift value which varies according to the cell.

In LTE-A corresponding to an evolved version of 3GPP LTE, high-order MIMO, multi-cell transmission, evolved MU-MIMO, etc. have been considered. To support efficient RS management and the evolved Tx scheme, DM RS-based data modulation has been considered in LTE-A. That is, unlike DMRS (Antenna Port Index #5) for Rank #1 beamforming defined in legacy 3GPP LTE (e.g., Release-8), DMRS for two or more layers may be defined to support data transmission through additional antennas.

Figure 11:
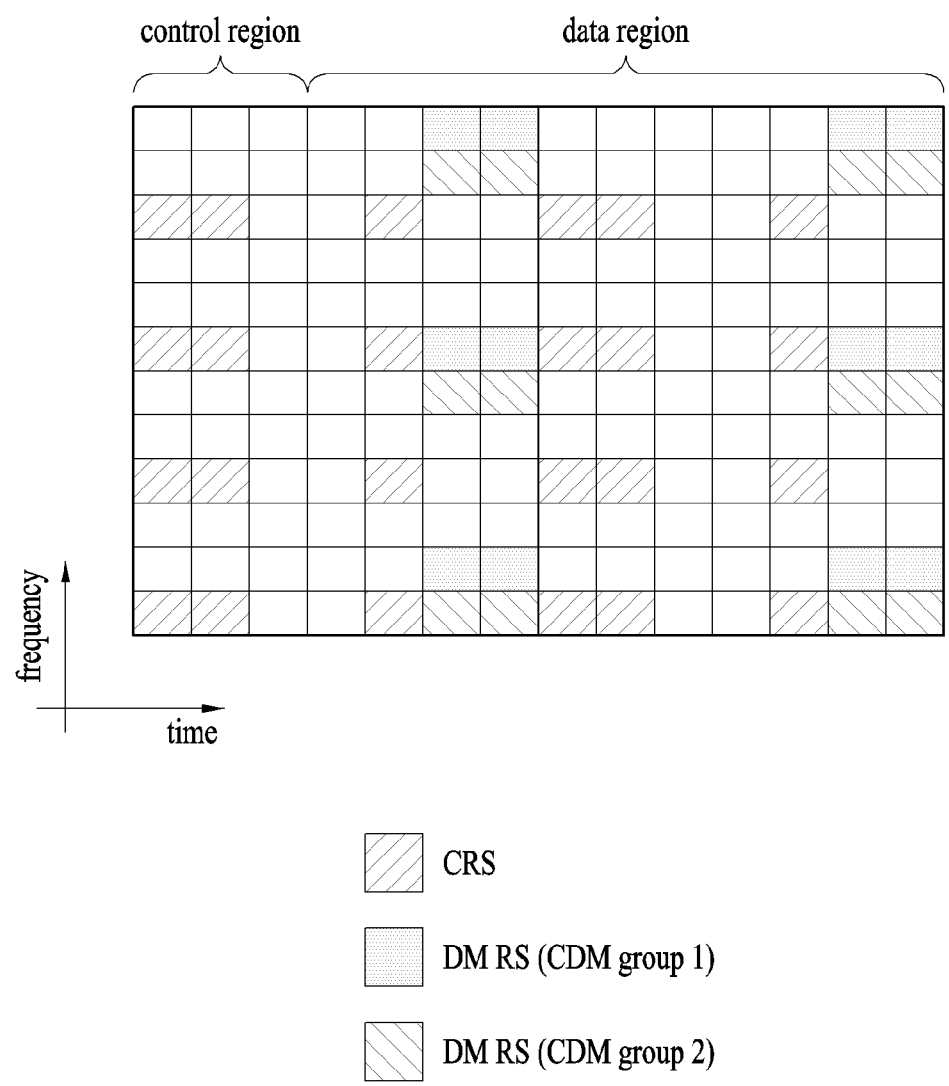
FIG. 11 is a diagram for an example of a downlink DMRS pattern.

FIG. 11 is a diagram showing exemplary DMRS patterns defined in LTE-A.

In FIG. 11, in case of one RB pair (in case of a normal CP, 14 OFDM symbols in a time domain×12 subcarriers in a frequency domain) used for DL data transmission, FIG. 6 shows the locations of resource elements (REs) used for DMRS transmission. DMRS may be transmitted to 8 antenna ports (Antenna Port Indexes #7 to #14) additionally defined in the LTE-A system. DMRSs for different antenna ports are located at different frequency resources (subcarriers) and/or different time resources (OFDM symbols), such that each DMRS can be identified. That is, DMRSs may be multiplexed according to the FDM and/or TDM scheme(s). In addition, DMRSs of different antenna ports located at the same time-frequency resources may be distinguished from each other by different orthogonal codes (that is, the DMRSs may be multiplexed according to the CDM scheme).

Meanwhile, in an LTE-A (Advanced) system which is an evolved version of the wireless communication system, separate CSI-RSs for measuring channel status information (CSI) for new antenna ports are defined.

Figure 12:
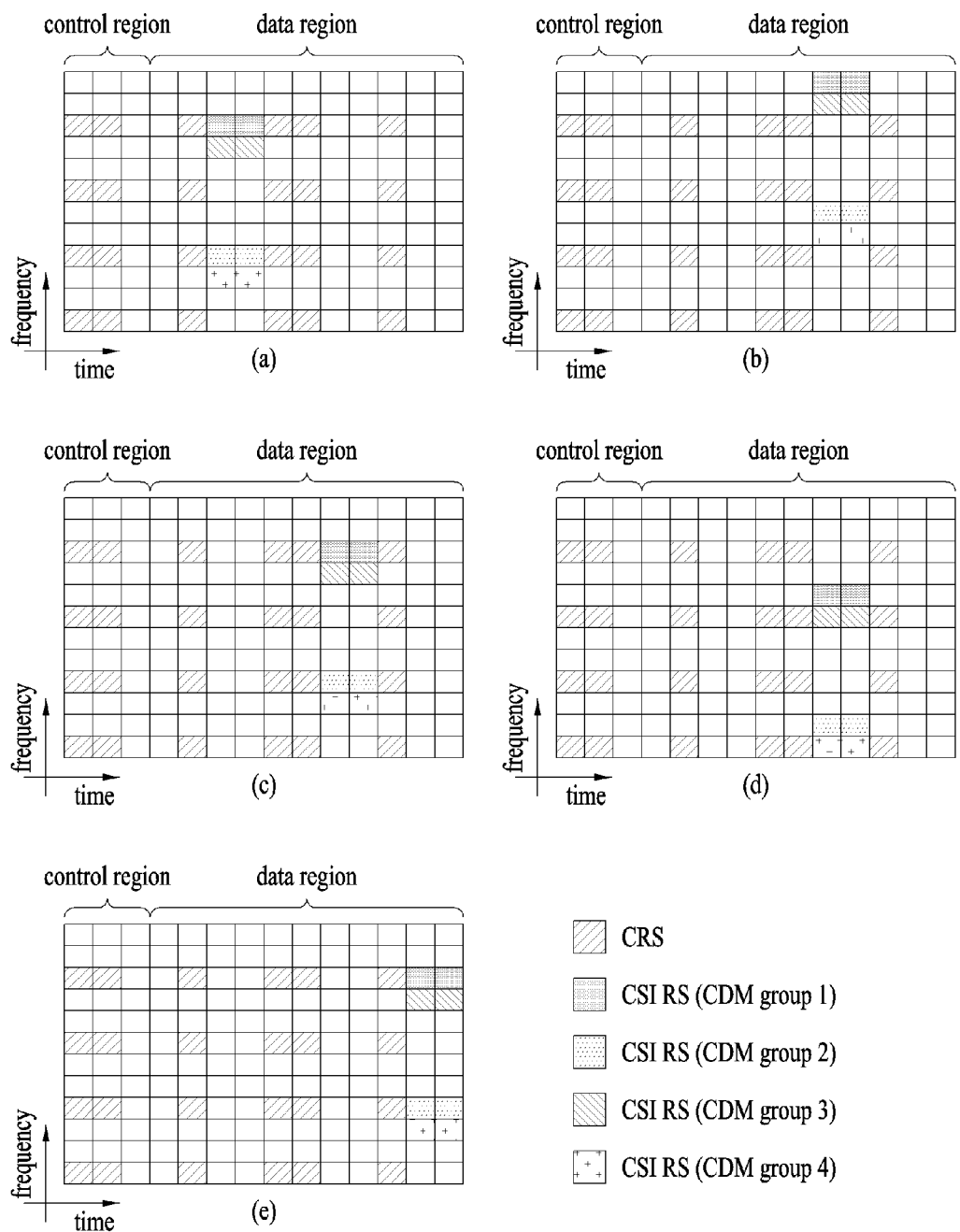
FIG. 12 is a diagram for examples of a CSI-RS pattern.

FIG. 12 is a diagram showing exemplary CSI-RS patterns defined in LTE-A. In more detail, in case of one RB pair (in case of a normal CP, 14 OFDM symbols in a time domain× 12 subcarriers in a frequency domain) used for DL data transmission. FIG. 12 shows the locations of resource elements (REs) used for CSI-RS transmission. One CSI-RS pattern shown in FIGS. 12(a) to 12(e) may be used in a certain DL subframe. CSI-RS may be transmitted to 8 antenna ports (Antenna Port Indexes #15 to #22) additionally defined in the LTE-A system. CSI-RSs for different antenna ports are located at different frequency resources (subcarriers) and/or different time resources (OFDM symbols), such that each CSI-RS can be identified. That is, CSI-RSs may be multiplexed according to the FDM and/or TDM scheme(s). In addition, CSI-RSs of different antenna ports located at the same time-frequency resources may be distinguished from each other by different orthogonal codes (that is, the CSI-RSs may be multiplexed according to the CDM scheme). As can be seen from FIG. 12(a), CSI-RSs of Antenna Ports #15 and #16 may be located at REs denoted by CSI-RS CDM Group #1, and may be multiplexed by orthogonal codes. CSI-RSs of Antenna Ports #17 and #18 may be located at REs denoted by CSI-RS CDM Group #2 as shown in FIG. 12(a), and may be multiplexed by orthogonal codes. In FIG. 12(a), CSI-RSs of Antenna Ports #19 and #20 may be located at REs denoted by CSI-RS CDM Group #3, and may be multiplexed by orthogonal codes. CSI-RSs of Antenna Ports #21 and #22 may be located at REs denoted by CSI-RS CDM Group #4 as shown in FIG. 12(a), and may be multiplexed by orthogonal codes. The same principles described in FIG. 12(a) may be applied to FIGS. 12(b) to 12(e).

RS patterns shown in FIGS. 10 to 12 are disclosed only for illustrative purposes, and the scope or spirit of the present invention are not limited only to these RS patterns. That is, even in the case in which RS pattern's different from those of FIGS. 10 to 12 are defined and used, various embodiments of the present invention can also be equally applied thereto without difficulty.

Carrier Aggregation

Figure 13:
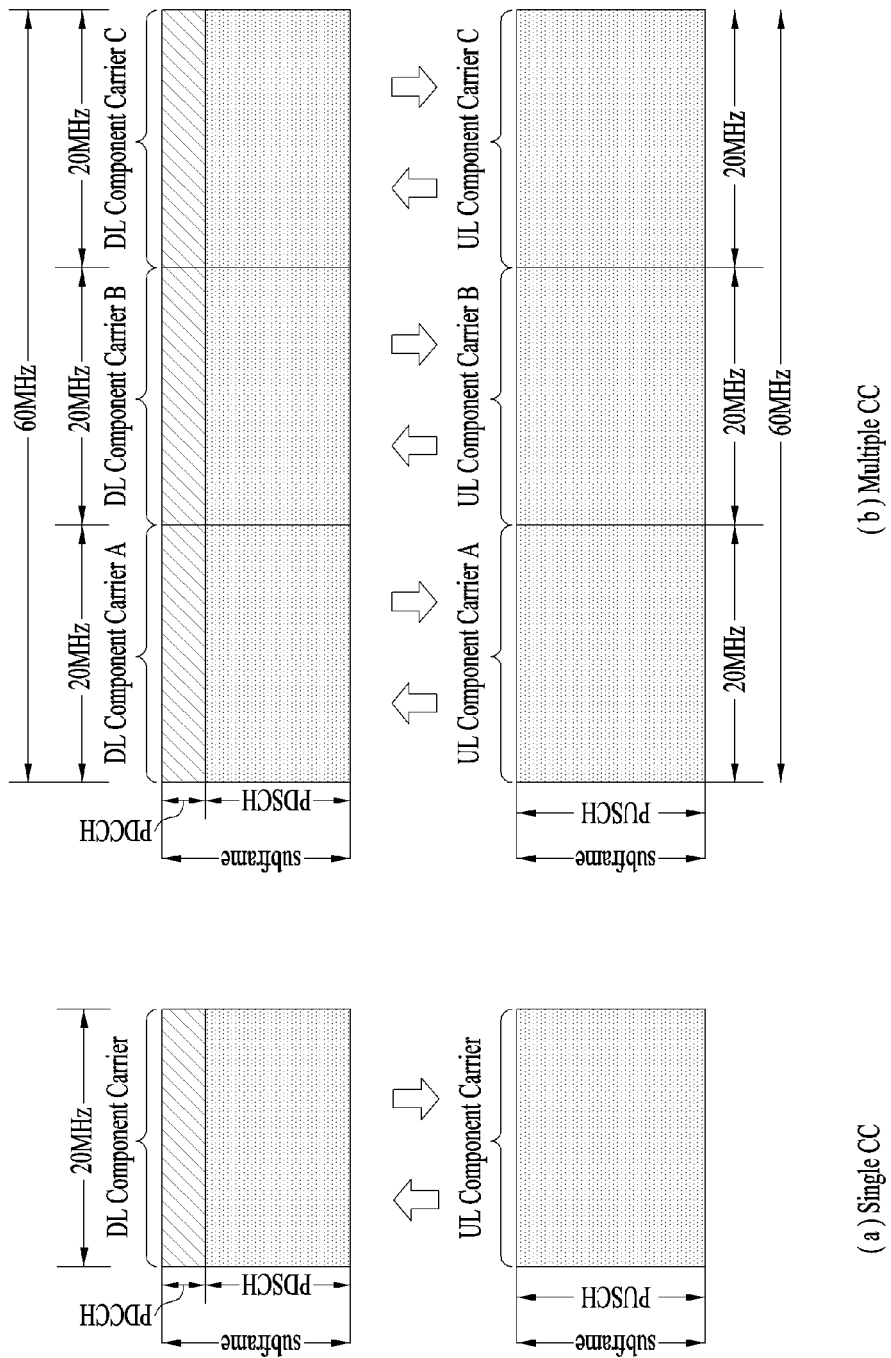
FIG. 13 is a diagram for explaining carrier aggregation.

FIG. 13 is a diagram illustrating carrier aggregation (CA). The concept of a cell, which is introduced to manage radio resources in LTE-A is described prior to the CA. A cell may be regarded as a combination of downlink resources and uplink resources. The uplink resources are not essential elements, and thus the cell may be composed of the downlink resources only or both the downlink resources and uplink resources. This is defined in LTE-A release 10, and the cell may be composed of the uplink resources only. The downlink resources may be referred to as downlink component carriers and the uplink resources may be referred to as uplink component carriers. A downlink component carrier (DL CC) and a uplink component carrier (UL CC) may be represented by carrier frequencies. A carrier frequency means a center frequency in a cell.

Cells may be divided into a primary cell (PCell) operating at a primary frequency and a secondary cell (SCell) operating at a secondary frequency. The PCell and SCell may be Collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCells. For a UE in an RRC connected state for which CA is not established or a UE that does not support CA, only one serving cell composed of the PCell is present. For a UE in the RRC-connected state for which CA is established, one or more serving cells are present and the serving cells include a PCell and SCells. For a UE that supports CA, a network may configure one or more SCells in addition to a PCell initially configured during connection establishment after initial security activation is initiated.

CA is described with reference to FIG. 13. CA is a technology introduced to use a wider band to meet demands for a high transmission rate. CA can be defined as aggregation of two or more component carriers (CCs) having different carrier frequencies. FIG. 13(a) shows a subframe when a conventional LTE system uses a single CC and FIG. 13(b) shows a subframe when CA is used. In FIG. 13(b), 3 CCs each having 20 MHz are used to support a bandwidth of 60 MHz. The CCs may be contiguous or non-contiguous.

A UE may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific UE may be limited to M (<N) CCs. Various parameters for CA may be configured cell-specifically, UE group-specifically, or UE-specifically.

Figure 14:
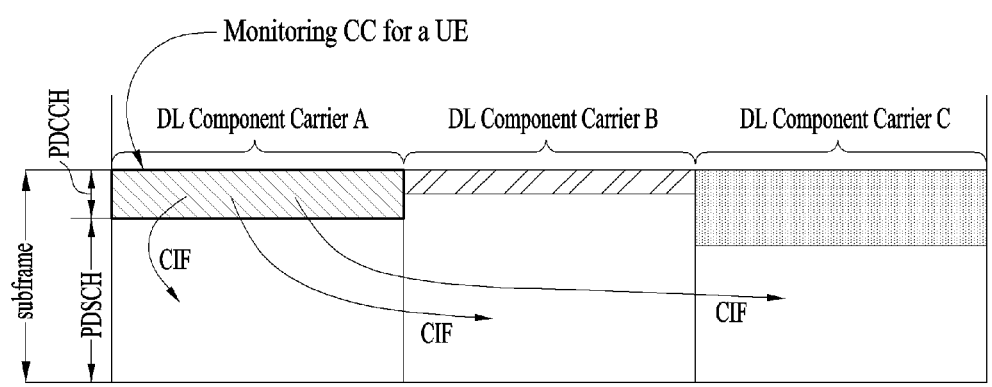
FIG. 14 is a diagram for explaining cross-carrier scheduling.

FIG. 14 is a diagram illustrating cross-carrier scheduling. Cross carrier scheduling is a scheme by which a control region of one of DL CCs of a plurality of serving cells includes downlink scheduling allocation information the other DL CCs or a scheme by which a control region of one of DL CCs of a plurality of serving cells includes uplink scheduling grant information about a plurality of UL CCs linked with the DL CC.

A carrier indicator field (CIF) is described first.

The CIF may be included in a DCI format transmitted through a PDCCH (for example, CIF may be 3 bits long), or may not be included in the DCI format transmitted through PDCCH (for example, CIF may be 0 bit long). When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 14, downlink allocation information for DL CC B and DL CC C, that is, information about PDSCH resources is transmitted through a PDCCH in a control region of DL CC A. A UE can recognize PDSCH resource regions and the corresponding CCs through the CIF by monitoring DL CCA.

Whether or not the CIF is included in a PDCCH may be semi-statically set and UE-specifically enabled according to higher layer signaling.

When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed length of 3 bits, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 9, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

Coordinated Multi-Point CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points (TPs). According to joint transmission, quality of a received signal can be improved coherently or non-coherently and interference on other UEs can be actively erased.

Dynamic cell selection (DCS) refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected. The Dynamic Cell Selection scheme may also be referred to as a Dynamic Point Selection (DPS) scheme.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

QCL (Quansi Co-Located) Relation

Large scale properties of a channel of which a signal is transmitted on a single antenna port can be inferred from a property of a channel of which a signal is transmitted on a different antenna port. In this case, it might say that the two antenna ports are QCL. In this case, the large scale properties of a channel can include at least one selected from the group consisting of delay spread, Doppler spread, Doppler shift, average gain and average delay.

For instance, a specific CSI-RS antenna port, a specific downlink DMRS antenna port and a specific CRS antenna port can be configured to be QCL. This configuration may correspond to a case that the specific CSI-RS antenna port, the specific downlink DMRS antenna port and the specific CRS antenna port correspond to antenna ports from a single serving cell.

And, a CSI-RS antenna port and a downlink DMRS antenna port can be configured to be QCL. For instance, in a CoMP situation in which a plurality of TPs are participating, a CSI-RS antenna port actually transmitted from a TP is not explicitly informed to a user equipment. In this case, it may be able to inform the user equipment that a specific CSI-RS antenna port and a specific DMRS antenna port are in a QCL relation. This may correspond to a case that the specific CSI-RS antenna port and the specific DMRS antenna port correspond to antenna ports from a single TP.

In this case, a user equipment can improve channel estimation capability through DMRS using information on large scale properties of a channel, which is obtained using a CSI-RS or n CRS. For instance, the user equipment may perform such an operation of controlling interference of a channel estimated from the DMRS and the like using delay spread of a channel estimated through the CSI-RS. This is because, since the CSI-RS or the CRS corresponds to a cell-specific signal transmitted over all bands in frequency domain, the CSI-RS or the CRS is able to more precisely identify large scale properties of a channel compared to the UE-specifically transmitted DMRS.

And, information on whether QCL is configured can be provided to a user equipment via downlink control information (e.g., a PQI field (PDSCH RE mapping and QCL indicator field) of a DCI format 2D). Specifically, parameter sets for a QCL configuration are configured in advance by upper layer and a specific parameter set among the QCL parameter sets can be indicated by the PQI field of the DCI format 2D.

Method of Monitoring Control Channel (PDCCH/EPDCCH)

As mentioned in the foregoing description, a user equipment capable of receiving an enhanced control channel (e.g., a user equipment operating according to a system after 3GPP LTE release-11) may operate by monitoring/detecting a legacy control channel (e.g., PDCCH). Or, the user equipment may operate by monitoring/detecting an enhanced control channel (e.g., EPDCCH). In this case, a base station may be able to inform the user equipment of a start OFDM symbol position of the control channel via upper layer signaling (e.g., RRC signaling).

When a user equipment monitors a control channel in a specific subframe, a base station can indicate whether the control channel detecting control information (or DCI) corresponds to a legacy PDCCH or EPDCCH via upper layer signaling.

If DCI is received via PDCCH, similar to an operation of a legacy UE, it is able to know the number of OFDM symbols (1, 2, 3 or 4) used by the PDCCH from CFI information included in PCFICH. Since the PDCCH is sequentially resource mapped from a first OFDM symbol (i.e., OFDM symbol index #0) in a subframe, a position of an OFDM symbol used for transmitting the PDCCH can be determined based on the number of OFDM symbols used for transmitting the PDCCH.

Or, if DCI is received via EPDCCH, information on a position of a resource element in which the EPDCCH is transmitted should be provided to a user equipment.

A base station may explicitly inform a user equipment of information on an EPDCCH start OFDM symbol via RRC signaling and the like. For instance, an EPDCCH-StartSymbol parameter in information element (IE) for EPDCCH configuration can be defined in RRC signaling. A value of the EPDCCH-StartSymbol parameter can be configured by one of integers ranging from 1 to 4 and the value can indicate an index (e.g., if an OFDM symbol index starts from 0, an OFDM symbol index) of the EPDCCH start OFDM symbol. For instance, if the EPDCCH-StartSymbol corresponds to 1, it may indicate that EPDCCH starts at a second (i.e., an OFDM symbol index #1) of a subframe.

Or, a user equipment may implicitly identify that EPDCCH exists from an OFDM symbol immediately after an OFDM symbol used for a legacy PDCCH, which is determined by CFI information of PCFICH, using the information on the EPDCCH start OFDM symbol.

Yet, in case of informing a user equipment of information on a type of control channel to be monitored and information on a scheme of determining a resource position in which EPDCCH monitoring is performed, signaling burden (or overhead) increases. And, in case of informing a user equipment of information on an EPDCCH start OFDM symbol position, overhead of the information is additionally increased. Moreover, if a type of a control channel to be monitored varies according to a subframe or a scheme of determining a position of monitoring a control channel varies according to a subframe, corresponding information should be informed to a user equipment via RRC signaling. In this case, overhead is considerably increased. Hence, due to the increase of the overhead of information necessary for monitoring a control channel, system performance may be deteriorated.

Hence, the present invention proposes a method of efficiently signaling information on a type (i.e., legacy PDCCH or EPDCCH) and information on a resource position in which EPDCCH monitoring is performed by integrating the information with each other. According to the proposal of the present invention, it is able to clearly provide information necessary for a user equipment to monitor a control channel and minimize increase of overhead, thereby enhancing overall system performance.

According to one example of the present invention, a position of an EPDCCH start OFDM symbol can be informed via RRC signaling in response to a specific subframe set. In this case, the specific subframe set can be defined by a specific subframe pattern and can be represented by a bitmap of 40-bit in 40-subframe unit. For instance, a subframe corresponding to 1 among the bitmap of 40-bit is defined as the specific subframe pattern and the position of the EPDCCH start OFDM symbol indicated by the RRC signaling is applied to a subframe(s) belonging to the specific subframe pattern.

Or, a position of a PDSCH start OFDM symbol can be informed in response to a specific subframe set and the position of the EPDCCH start OFDM symbol can be determined in a manner of being identical to the position of the PDSCH start OFDM symbol.

As mentioned in the foregoing description, information capable of determining a position of an EPDCCH start OFDM symbol in response to a specific subframe set can be individually applied according to a user equipment or a user equipment group unit.

In the following, the proposal of the present invention is explained with reference to concrete examples.

According to an example of the present invention, subframes are divided into one or more sets and a control channel detection method can be configured according to each subframe set. In this case, a criterion distinguishing one subframe set from another subframe set may be determined according to a subframe type (or subframe property).

For instance, a type of a subframe type may correspond to a sort of a subframe. Specifically, a subframe type can be distinguished from each other based on whether a subframe corresponds to a normal CP subframe, an extended CP subframe, or an MBSFN (multicast broadcast single frequency network) subframe, whether a subframe corresponds to a special subframe in TDD, and the like.

Instead or in addition, a type of a subframe can be distinguished from each other according to whether a subframe corresponds to a subframe capable of transmitting EPDCCH (e.g., it is able to configure that EPDCCH is not transmitted in a subframe index #0 and #5 in which PSS (primary synchronization signal)/SSS (secondary synchronization signal)/PBCH (physical broadcast channel) is transmitted in FDD and a subframe index #0, #1, #5 and #6 in which PSS/SSS/PBCFI is transmitted in TDD).

Instead or in addition, a subframe set can be distinguished from each other based on a subframe configured to differentiate a method for a user equipment to obtain control information according to an intention of a base station. In particular, a subframe set can be determined based on determination of a base station capable of considering all scheduling information of a user equipment. For instance, a subframe set A (or a first subframe set) can consist of subframes, which should monitor EPDCCH starting at an $i^{th}$ OFDM symbol. On the contrary, a subframe set B (or a second subframe set) can consist of subframes, which should monitor EPDCCH starting at a $k^{th}$ OFDM symbol. Hence, when one or more subframe sets are distinguished from each other/configured, there may exist remaining subframe(s) not belonging to any subframe set.

When one or more subframe sets are configured, a (i.e., a method of determining a control channel to be monitored among PDCCH and EPDCCH) of obtaining control information (i.e., DCI) from each subframe can be configured.

If DCI is configured to be obtained from a specific subframe set by monitoring PDCCH, similar to an operation of a legacy user equipment (or as a default operation), it is able to determine a position of an OFDM symbol used for transmitting PDCCH based on the number of OFDM symbols used for transmitting the PDCCH via PCFICH.

If DCI is configured to be obtained from a specific subframe set by monitoring EPDCCH, it is necessary to inform a user equipment of a resource area (e.g., EPDCCH stat OFDM symbol position) to which the EPDCCH is mapped. In this case, assume that the resource area to which the EPDCCH is mapped corresponds to an area ranging from a prescribed start OFDM symbol to a last OFDM symbol (e.g., $14^{th}$ OFDM symbol in a normal CP (i.e., when an OFDM symbol index starts from 0, an OFDM symbol index #13) in a PRB pair (i.e., a unit defined as one subframe (e.g., 14 OFDM symbols in a normal CP in time domain)*12 subcarriers in frequency domain)). In particular, if a start OFDM symbol position of EPDCCH is informed to a user equipment, the user equipment is able to recognize it as the EPDCCH exists at the position to the last OFDM symbol. In this case, the start OFDM symbol position of the EPDCCH can be indirectly determined (or derived) from PCFICH. For instance, an OFDM symbol immediately after a last OFDM symbol position, which is used for transmitting PDCCH determined based on CFI information can be determined as the start OFDM symbol position of the EPDCCH. Or, the start OFDM symbol position of the EPDCCH can be explicitly given via RRC signaling. Yet, a base station can inform a user equipment of whether information on the start OFDM symbol position of the EPDCCH is indirectly indicated from the CFI information of the PCFICH or the information on the start OFDM symbol position of the EPDCCH is explicitly indicated via RRC signaling via upper layer signaling.

Figure 15:
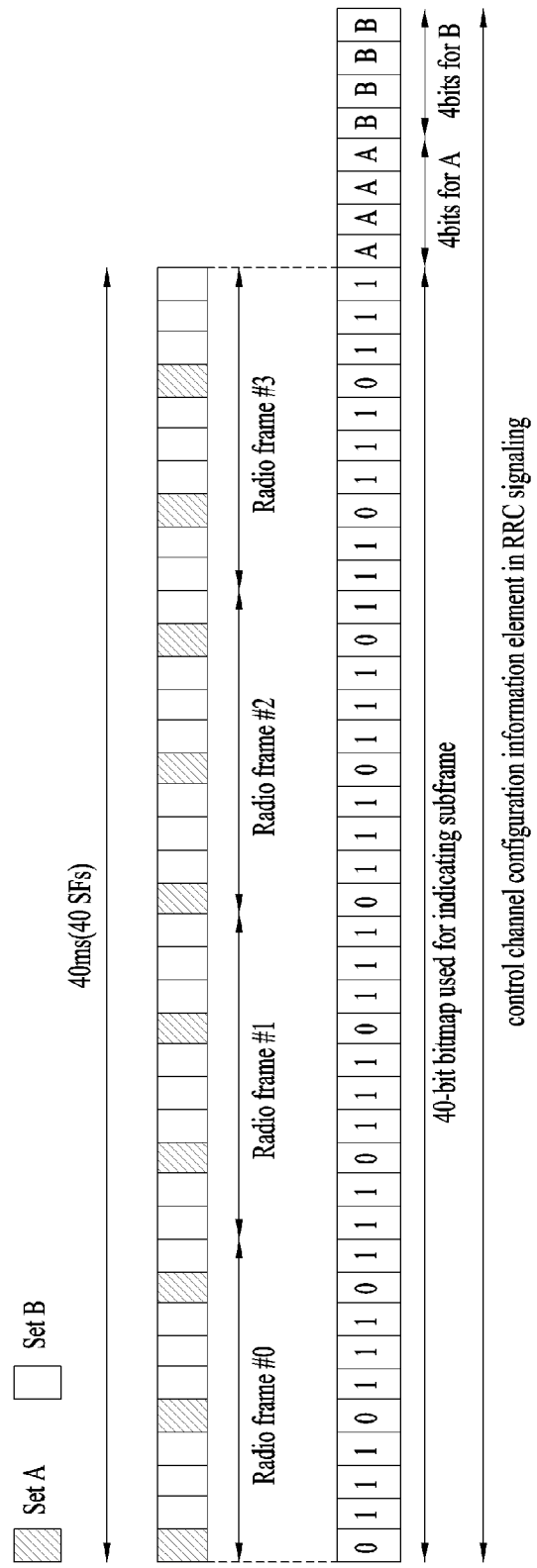
FIG. 15 is a diagram for explaining an example of an upper layer signaling information element according to the present invention.

FIG. 15 is a diagram for explaining an example of an upper layer signaling information element according to the present invention.

Referring to an example of FIG. 15, it shows an upper layer (e.g., RRC) signaling information element (IE) indicating a subframe pattern which is repeated with a period of 40 ms (i.e., 40 subframes (SFs)). The IE shown in FIG. 15 corresponds to an IF for a control channel configuration. The 40 subframes can be divided into a set A and a set B according to a prescribed criterion. A base station can inform a user equipment of a 40-bit bitmap to indicate whether a subframe is included in the set A or the set B. In the example shown in FIG. 15, a value 0 in the 40-bit bitmap indicates the subframe set A and a value 1 indicates the subframe set B.

In addition, the control channel configuration IE may include a field configured to indicate a type of a control channel (i.e., PDCCH or EPDCCH) to be monitored according to each subframe set. Along with this, if it is indicated to monitor the EPDCCH in a specific subframe set, information indicating whether a start OFDM symbol position of the EPDCCH is inferred from CFI of PCFICH or a specific OFDM symbol is explicitly indicated via RRC signaling can be included in the control channel configuration IE. And, if EPDCCH start OFDM symbol position is explicitly indicated for a specific subframe set, information indicating the corresponding OFDM symbol can be included in the control channel configuration IE. In this case, the EPDCCH start OFDM symbol position can be indicated by a value among maximum 7 OFDM symbols (or one of OFDM symbol index #0 to #6 when an OFDM symbol index starts from 0) of a first slot (or, if a slot index starts from 0, even numbered slot) of a PRB pair.

For instance, in addition to the 40 bits corresponding to the bitmap shown in FIG. 15, 4 bits (represented as AAAA in FIG. 15) for the subframe set A and 4 bits (represented as BBBB in FIG. 15) for the subframe set B can be included in the control channel configuration IE. States for the 8 bits and meaning of the states can be defined as follows in Table 4.

TABLE 4

| Subframe set | First field (1 bit) | Second field (3 bits) | meaning |
|---|---|---|---|
| set A | 0: PDCCH monitoring | 0 (000): | PCFICH informs UE of size of PDCCH area |
| | 1: EPDCCH monitoring | 0 (000): | RRC informs UE that start OFDM symbol of EPDCCH area corresponds to symbol #0 |

TABLE 4-continued

| Subframe set | First field (1 bit) | Second field (3 bits) | meaning |
|---|---|---|---|
| | | 1 (001): designated by RRC | RRC informs UE that start OFDM symbol of EPDCCH area corresponds to symbol #1 |
| | | 2 (010): designated by RRC | RRC informs UE that start OFDM symbol of EPDCCH area corresponds to symbol #2 |
| | | 3 (011): designated by RRC | RRC informs UE that start OFDM symbol of EPDCCH area corresponds to symbol #3 |
| | | 4 (100): designated by RRC | RRC informs UE that start OFDM symbol of EPDCCH area corresponds to symbol #4 |
| | | 5 (101): designated by RRC | RRC informs UE that start OFDM symbol of EPDCCH area corresponds to symbol #5 |
| | | 6 (110): designated by RRC | RRC informs UE that start OFDM symbol of EPDCCH area corresponds to symbol #6 |
| | | 7 (111): designated by PCFICH | PCFICH informs UE of size of PDCCH area |
| set B | 0: PDCCH monitoring | 0 (000): designated by PCFICH | PCFICH informs UE of size of PDCCH area |
| | 1: EPDCCH monitoring | 0 (000): designated by RRC | RRC informs UE that start OFDM symbol of EPDCCH area corresponds to symbol #0 |
| | | 1 (001): designated by RRC | RRC informs UE that start OFDM symbol of EPDCCH area corresponds to symbol #1 |
| | | 2 (010): designated by RRC | RRC informs UE that start OFDM symbol of EPDCCH area corresponds to symbol #2 |
| | | 3 (011): designated by RRC | RRC informs UE that start OFDM symbol of EPDCCH area corresponds to symbol #3 |
| | | 4(100): designated by RRC | RRC informs UE that start OFDM symbol of EPDCCH area corresponds to symbol #4 |
| | | 5 (101): designated by RRC | RRC informs UE that start OFDM symbol of EPDCCH area corresponds to symbol #5 |
| | | 6 (110): designated by RRC | RRC informs UE that start OFDM symbol of EPDCCH area corresponds to symbol #6 |
| | | 7 (111): designated by PCFICH | PCFICH informs UE of size of PDCCH area |

Figure 16:
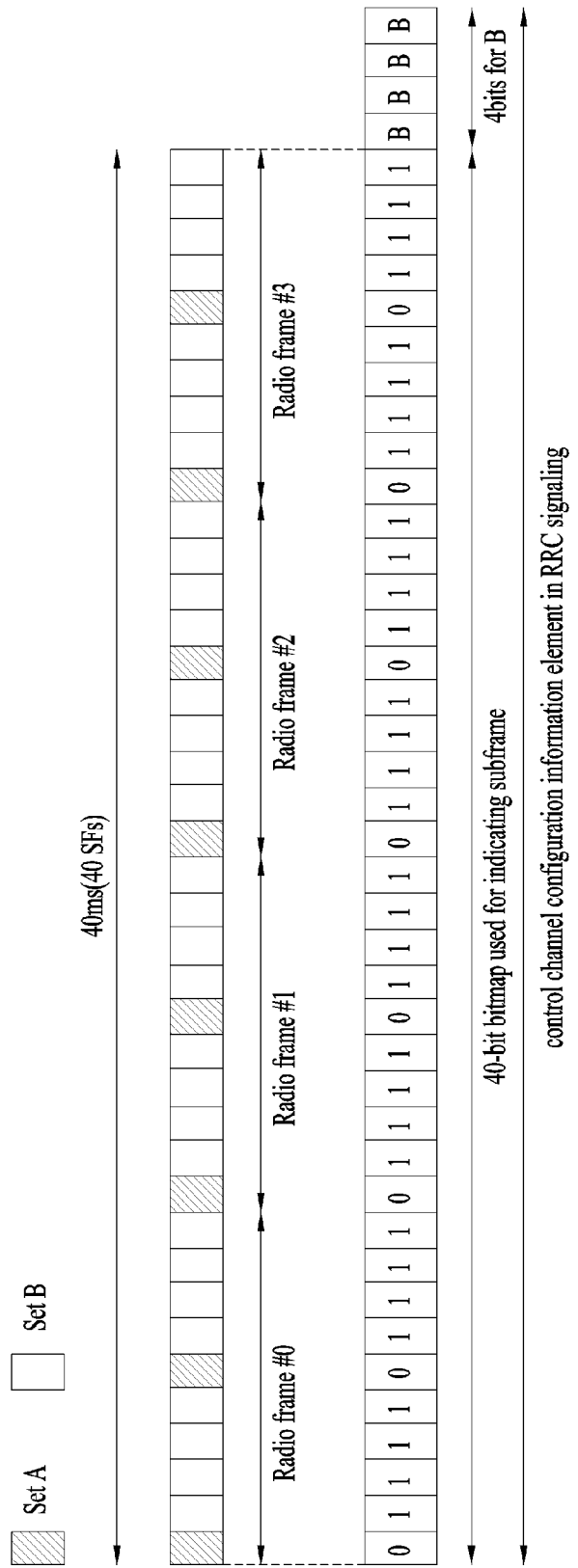
FIG. 16 is a diagram for explaining a different example of an upper layer signaling information element according to the present invention.

FIG. 16 is a diagram for explaining a different example of an upper layer signaling information element according to the present invention.

An example shown in FIG. 16 corresponds to an example from which a partial field of control channel configuration IE shown in an example of FIG. 15 is omitted.

In the example of FIG. 16, assume that a subframe set A includes subframes incapable of transmitting EPDCCH and a subframe set B includes subframes capable of transmitting EPDCCH. For instance, in FDD system, the subframe set A includes subframes respectively corresponding to a subframe index #0 and a subframe index #5 in a radio frame (i.e., a set of subframe index #0 to #9) and the subframe set B can include the rest of subframes. In this case, since it is impossible to transmit EPDCCH in the subframe set A, the subframe set A is always configured to monitor PDCCH. On the contrary, since it is possible to transmit EPDCCH in the subframe set B, the subframe set B is configured to monitor PDCCH or EPDCCH. In this case, similar to an operation of a legacy user equipment (or, as a default operation), a user equipment is able to know a size of a PDCCH area via CFI of PCFICH in the subframe set A. Since the user equipment is able to monitor PDCCH and detect DCI based on the size of the PDCCH area, if a corresponding subframe belonging to the subframe set A is informed to the user equipment via a bitmap without a separate indication, ambiguity of an operation of the user equipment does not occur. Hence, additional 4 bits (represented as AAAA in FIG. 15) in FIG. 15 for the set A can be omitted in the example of FIG. 16. In this case, states for additional 4 bits (represented as BBBB in FIG. 16) for the set B and meaning of the states can be defined as shown in a set B part in Table 4.

Figure 17:
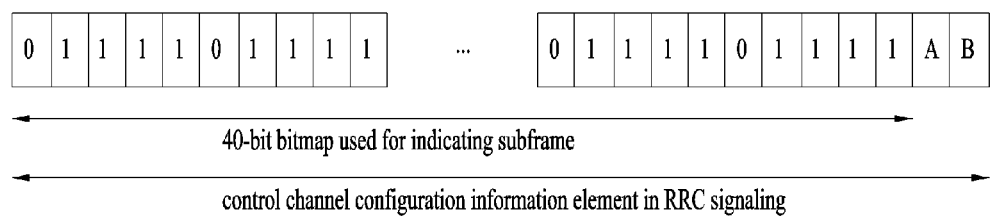
FIG. 17 is a diagram for explaining a further different example of an upper layer signaling information element according to the present invention.

FIG. 17 is a diagram for explaining a further different example of an upper layer signaling information element according to the present invention.

In an example of FIG. 17, assume that 40 subframes are divided into a subframe set A and a subframe set B and both the subframe set A and the subframe set B are configured to monitor PDCCH or EPDCCH. In this case, if a size of a PDCCH area is determined according to CFI information of PCFICH and a position of a start OFDM symbol of EPD-CCH is determined by an OFDM symbol immediately after the PDCCH area indicated by the CFI information of the PCFICH, 3 bits of a second field for each subframe set shown in Table 4 can be omitted. Hence, an example of a control channel configuration IE of FIG. 17 shows that 1 bit is additionally added to each set in addition to a 40-bit bitmap, which indicates a set to which a subframe belongs thereto.

Figure 18:
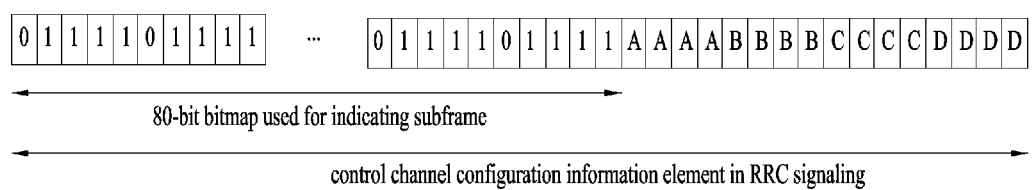
FIG. 18 is a diagram for explaining a further different example of an upper layer signaling information element according to the present invention.

FIG. 18 is a diagram for explaining a further different example of an upper layer signaling information element according to the present invention.

In an example of FIG. 18, assume that 40 subframes are divided into a subframe set A, a subframe set B, a subframe set C and a subframe set D (or, a first subframe set, a second subframe set, a third' subframe set and a fourth subframe set) and all of the subframe set A to the subframe set D are configured to monitor PDCCH or EPDCCH. In this case, in order for a single subframe to indicate a subframe set to which the subframe belongs among the four subframe sets, 2 bits are required. Hence, a bitmap indicating a set to which each subframe belongs thereto among 4 sets for 40 subframes can be defined by a size of 80 bits. And, it is necessary to define a first field (1 bit size) indicating whether to monitor PDCCH or EPDCCH for each subframe set. In case of monitoring EPDCCH, it is necessary to define a second field (3 bits size) indicating an EPDCCH start OFDM symbol position and the like. Hence, total 16 bits (represented as AAAA, BBBB, CCCC, and DDDD in an example of FIG. 18) (4 bits per each subframe set) are included in the control channel configuration IE in addition to the 80-bit bitmap.

Figure 19:
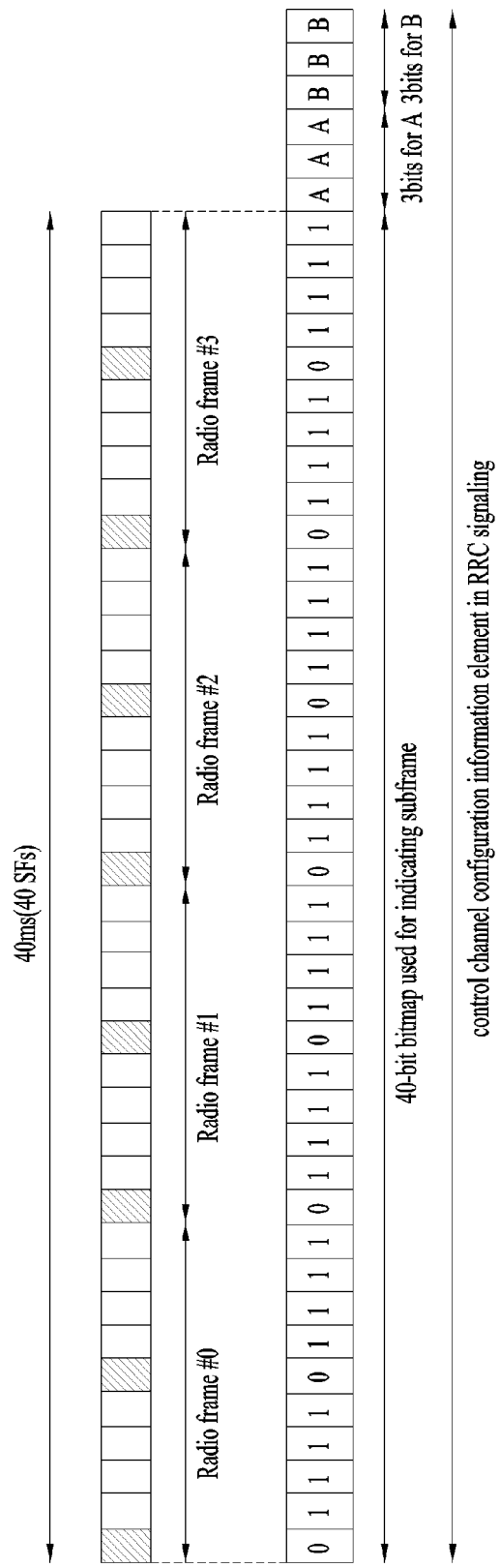
FIG. 19 is a diagram for explaining a further different example of an upper layer signaling information element according to the present invention.

FIG. 19 is a diagram for explaining a further different example of an upper layer signaling information element according to the present invention.

As an additional example of the present invention, it may be able to configure a compressed field of 3-bit size in a manner of combining a first field and a second field shown in Table 4 with each other. An example of FIG. 19 shows that total 6 bits (represented as AAA and BBB in the example of FIG. 18) (3 bits per each subframe set) of the compressed fields of 3-bit size are included in control channel configuration IE in addition to the 40-bit bitmap. State for the compressed field and meaning of the field can be defined as shown in Table 5 in the following.

TABLE 5

| state   | meaning |
|---------|---------|
| 0 (000) | PDCCH monitoring |
| 1 (001) | EPDCCH monitoring + EPDCCH start OFDM symbol is indicated by PCFICH |
| 2 (010) | EPDCCH monitoring + EPDCCH start OFDM symbol is #0 |
| 3 (011) | EPDCCH monitoring + EPDCCH start OFDM symbol is #1 |
| 4 (100) | EPDCCH monitoring + EPDCCH start OFDM symbol is #2 |
| 5 (101) | EPDCCH monitoring + EPDCCH start OFDM symbol is #3 |
| 6 (110) | EPDCCH monitoring + EPDCCH start OFDM symbol is #4 |
| 7 (111) | EPDCCH monitoring + EPDCCH start OFDM symbol is #5 |

Method of Monitoring PHICH

When a user equipment monitors EPDCCH according to the examples mentioned earlier in the foregoing description, EPDCCH start OFDM symbol position can be explicitly indicated by a base station. As an additional embodiment of the present invention, the present invention proposes a method for a user equipment to implicitly determine whether to monitor/detect PHICH based on information on the EPDCCH start OFDM symbol position.

Since a position of an EPDCCH start OFDM symbol can be overlapped with a PDCCH/PHICH area, it is necessary to determine whether to monitor PDCCH/PHICH in consideration of the EPDCCH start OFDM symbol position. In case of a single cell or a single transmission point (TP), the EPDCCH start OFDM symbol position is determined by a position after an OFDM symbol used for transmitting PDCCH. Hence, a problem of overlapping may not occur. Yet, if carrier aggregation or a CoMP operation is applied, a single user equipment may receive services from a plurality of cells or a plurality of TPs. In this case, a PDCCH area from a single cell/TP and an EPDCCH area from a different cell/TP may be overlapped with each other. For instance, when a serving cell transmits PDCCH using 3 OFDM symbols (i.e., OFDM symbol index #0 to #2) (i.e., an EPDCCH start OFDM symbol position of the serving cell corresponds to an OFDM symbol index #3) and a neighbor cell transmits PDCCH using 2 OFDM symbols (i.e., OFDM symbol index #0 and #1) (i.e., an EPDCCH start OFDM symbol position of the neighbor cell corresponds to an OFDM symbol index #2), if DCI is received via EPDCCH from the neighbor cell in CoMP operation, it may collide with a PDCCH area of the serving cell. Hence, in this case, ambiguity of UE operation can be eliminated only when whether a user equipment monitors PHICH/PDCCH/EPD-CCH is defined.

To this end, a user equipment can compare an EPDCCH area and a PDCCH area with each other. The EPDCCH area is determined based on information on a position of an EPDCCH start OFDM symbol for a specific subframe set and the information can be provided by a base station via RRC signaling. And, the PDCCH area can be determined based on CFI information of PCFICH or can be indirectly inferred from information on PHICH duration. After the comparison, the user equipment can determine whether to monitor PHICH existing at a PDCCCH area in a specific subframe or a specific subframe set. If the EPDCCH area and the PDCCH area collide with each other, the user equipment can be configured not to monitor PHICH.

For instance, if a position of an EPDCCH start OFDM symbol set to a specific subframe corresponds to an OFDM symbol index #0 (i.e., a first OFDM symbol of a subframe), the user equipment assumes that PDCCH transmission (or, PHICH transmission in a PDCCH area) is not performed in the specific subframe and does not perform PHICH monitoring.

As a different example, if a PHICH duration type is configured as an extended PHICH duration based on information provided via PBCH and the like, a user equipment may assume that the number of OFDM symbols used for transmitting PDCCH corresponds to a prescribed value. For instance, if the extended PHICH duration is configured, the user equipment may be able to assume that the minimum number of OFDM symbols used for transmitting PDCCH corresponds to 2 in a subframe corresponding to a non-MBSFN subframe in TDD system and the subframe corresponding to a subframe index #1 and #6 and may be able to assume that the minimum number of OFDM symbols used for transmitting PDCCH corresponds to 3 in a subframe corresponding to a non-MBSFN Subframe in TDD system and the subframe not corresponding to a subframe index #1 or #6. If a position of an EPDCCH start OFDM symbol for a specific subframe indicated via RRC signaling and the like is overlapped with a PDCCH area determined according to the PHICH duration, the user equipment determines that it is impossible to detect PHICH in the corresponding subframe, assumes that PDCCH transmission (or, PHICH transmission in a PDCCH area) is not performed, and does not perform PHICH monitoring.

And, if the EPDCCH start OFDM symbol position is configured via RRC signaling and the like, the user equipment can implicitly determine that PHICH is not monitored in a subframe in which EPDCCH is to be monitored. This because, if information on the EPDCCH start OFDM symbol position is provided to the user equipment, it may be interpreted as preparing for a case of uncertain PCFICH detection. In particular, if PCFICH detection is certain, the number of OFDM symbols used for transmitting PDCCH can be clearly determined and the EPDCCH start OFDM symbol position can be inferred from the number of the OFDM symbols. On the contrary, if the PCFICH detection is impossible or uncertain, the EPDCCH start OFDM symbol position should be provided to the user equipment to monitor EPDCCH. For instance, when a subframe is configured as a non-ABS (almost blank subframe) (in this case, an ABS indicates a subframe in which a CRS is transmitted only in a control region and a data region of a downlink subframe and the subframe in which other control information and data are not transmitted), if the subframe is interfered by a neighbor cell (in particular, if the subframe is interfered by a CRS of the neighbor cell), a situation that the PCFICH detection is uncertain may occur.

Or, an explicit indication making PHICH monitoring not to be performed in a specific subframe can be provided to the user equipment.

In the examples of the present invention mentioned earlier in the foregoing description, if a plurality of subframe sets are set to a user equipment, it is assumed a case that a single subframe belongs to a single subframe set among a plurality of the subframe sets. As an additional example, a plurality of EPDCCH sets can be configured for a single subframe. For instance, in case of a CoMP situation, a first EPDCCH set corresponds to an EPDCCH configuration (e.g., EPDCCH start OFDM symbol an OFDM=symbol index #2) of a first TP and a second EPDCCH set may correspond to an EPDCCH configuration (e.g., EPDCCH start OFDM symbol=an OFDM symbol index #3) of a second TP. Moreover, in case of performing CoMP DPS operation, since a TP transmitting data is dynamically determined among the first TP and the second TP in a single subframe, a serving base station should inform the single subframe of each EPDCCH configuration of TPs capable of participating in the CoMP DPS in advance via RRC signaling and the like. Hence, a plurality of EPDCCH sets can be RRC configured for the single subframe.

In this case, if a plurality of EPDCCH sets are configured for a specific subframe (or, a specific subframe set), a user equipment may not perform PHICH Monitoring irrespective of whether the EPDCCH start OFDM symbol position is overlapped with a PDCCH area due to the EPDCCH sets. As mentioned in the foregoing description, this is because, if the EPDCCH start OFDM symbol position is configured via RRC, it may be interpreted as PCFICH detection is uncertain in the CoMP DPS situation. In particular, uncertainty of PCFICH detection is taken into consideration in the CoMP situation due to collision between PCFICH of a serving cell and EPDCCH of a neighbor cell.

Or, when a plurality of EPDCCH sets are configured for a specific subframe (or, a specific subframe set), if a EPDCCH start ODFM symbol position according to at least one of a plurality of the EPDCCH sets is overlapped with a PDCCH area, a user equipment can be configured not to perform PHICH monitoring. On the contrary, if the EPDCCH start ODFM symbol position according to the EPDCCH set is not overlapped with the PDCCH area, the user equipment can be configured to perform the PHICH monitoring.

As an additional example, a plurality of EPDCCH sets, which have an EPDCCH start OFDM symbol position different from each other for a single subframe, can be RRC configured in a CoMP DPS situation. Among a plurality of the EPDCCH sets, there may exist an EPDCCH set of which an EPDCCH start OFDM symbol position is overlapped with a PDCCH area or an EPDCCH set of which an EPDCCH start OFDM symbol position is overlapped with a PHICH duration. In this case, if a TP transmitting PHICH and a TP transmitting EPDCCH are different from each other, a user equipment can be configured to perform PHICH monitoring. Whether the TP transmitting PHICH is different from the TP transmitting EPDCCH can be determined based on whether a CRS (or, a CRS antenna port) of a serving cell is in a QCL (Quansi-Co-Located) relation with a DMRS (or, EPDCCH-DMRS antenna port) of EPDCCH.

For instance, if a CRS port of a serving cell is not in QCL relation with a DMRS port of a specific EPDCCH, it is able to determine as the TP transmitting PHICH and the TP transmitting EPDCCH are not identical to each other. In this case, although an EPDCCH start OFDM symbol position is overlapped with a PDCCH area or a PHICH duration, a user equipment assumes that PHICH from a serving cell is transmittable and may be able to perform PHICH monitoring. This is because, if the DMRS of the EPDCCH is not in the QCL relation with the CRS of the serving cell, it is able to assume that interference caused by the EPDCCH is not sufficient enough to deteriorate PHICH detection of the serving cell. Moreover, if an antenna port used for transmitting PHICH and an antenna port used for transmitting EPDCCH are different from each other, it is able to assume that interference between the antenna ports is low. In this case, although an EPDCCH start OFDM symbol position of EPDCCH is overlapped with a PDCCH area or a PHICH duration, a user equipment can perform PHICH monitoring.

Figure 20:
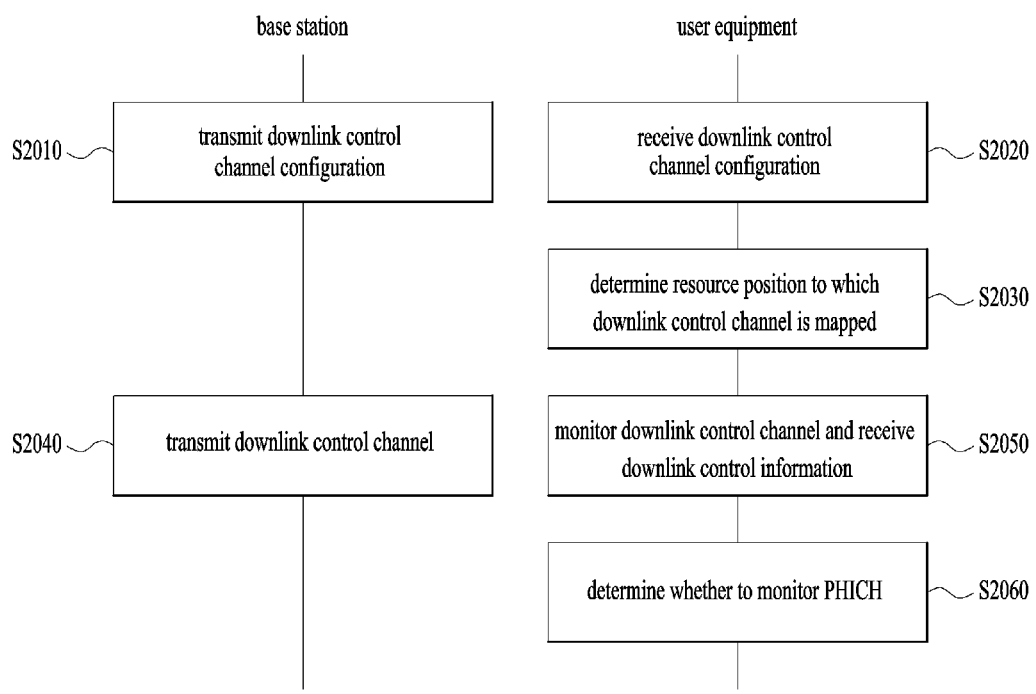
FIG. 20 is a flowchart for explaining a method of transmitting and receiving downlink control information according to one example of the present invention.

FIG. 20 is a flowchart for explaining a method of transmitting and receiving downlink control information according to one example of the present invention.

In the step S2010, a base station can transmit an information element (e.g., control channel configuration IE) including downlink subframe configuration information (e.g., bitmap) and information indicating a downlink control channel type (e.g., PDCCH or EPDCCH) for each downlink subframe set to a user equipment through upper layer signaling and the like. In the step S2020, the user equipment can receive the information element from the base station. The information element can further include information (e.g., information indicating an EPDCCH start OFDM symbol position) indicating a resource position to which the downlink control channel is mapped in a specific downlink subframe set. The information indicating the resource position may or may not be included in the information element according to the downlink control channel type.

In the step S2030, the user equipment can determine the resource position to which the downlink control channel is mapped in a specific downlink subframe set using the received information element and other control information (e.g., CFI information transmitted on PCFICH, PHICH duration information or the like).

In the step S2040, the base station can transmit a downlink control channel of a type indicated by the information element to the user equipment in a specific downlink subframe. In the step S2050, the user equipment can monitor a downlink control channel corresponding to a downlink control channel type, which is indicated in response to a specific subframe set, on the determined resource position of a subframe belonging to the specific downlink subframe set. As a result of the monitoring, if the downlink control channel is detected, the user equipment can receive downlink control information transmitted on the downlink control channel.

In the step of S2060, the user equipment determines whether to monitor PHICH and may be able to operate according to a result of the determination. For instance, if the user equipment monitors EPDCCH in a specific downlink subframe, the user equipment can determine whether to monitor PHICH in the specific downlink subframe based on whether the EPDCCH is overlapped with a PDCCH area, whether an EPDCCH resource mapping position is included in the information element, whether an antenna port of a serving cell CRS is in QCL relation with an antenna port of EPDCCH DMRS and the like.

The steps explained in the example of FIG. 20 may be non-limited by a time-series order.

In case of the method of transmitting and receiving downlink control information mentioned earlier with reference to FIG. 20, items explained in various embodiments of the present invention can be independently applied or two or more embodiments can be applied at the same time. For clarity, explanation on duplicated contents is omitted at this time.

And, in explaining various embodiments of the present invention, a main entity of downlink transmission is mainly explained with an example of a base station and a main entity of uplink transmission is mainly explained with an example of a user equipment by which the present invention may be non-limited. In particular, if a relay becomes a main entity of downlink transmission to the user equipment or the relay becomes a main entity of uplink reception from the user equipment, or if the relay becomes a main entity of uplink transmission to the base station or the relay becomes a main entity of downlink reception from the base station, the principle of the present invention explained via various embodiments of the present invention can be identically applied.

Figure 21:
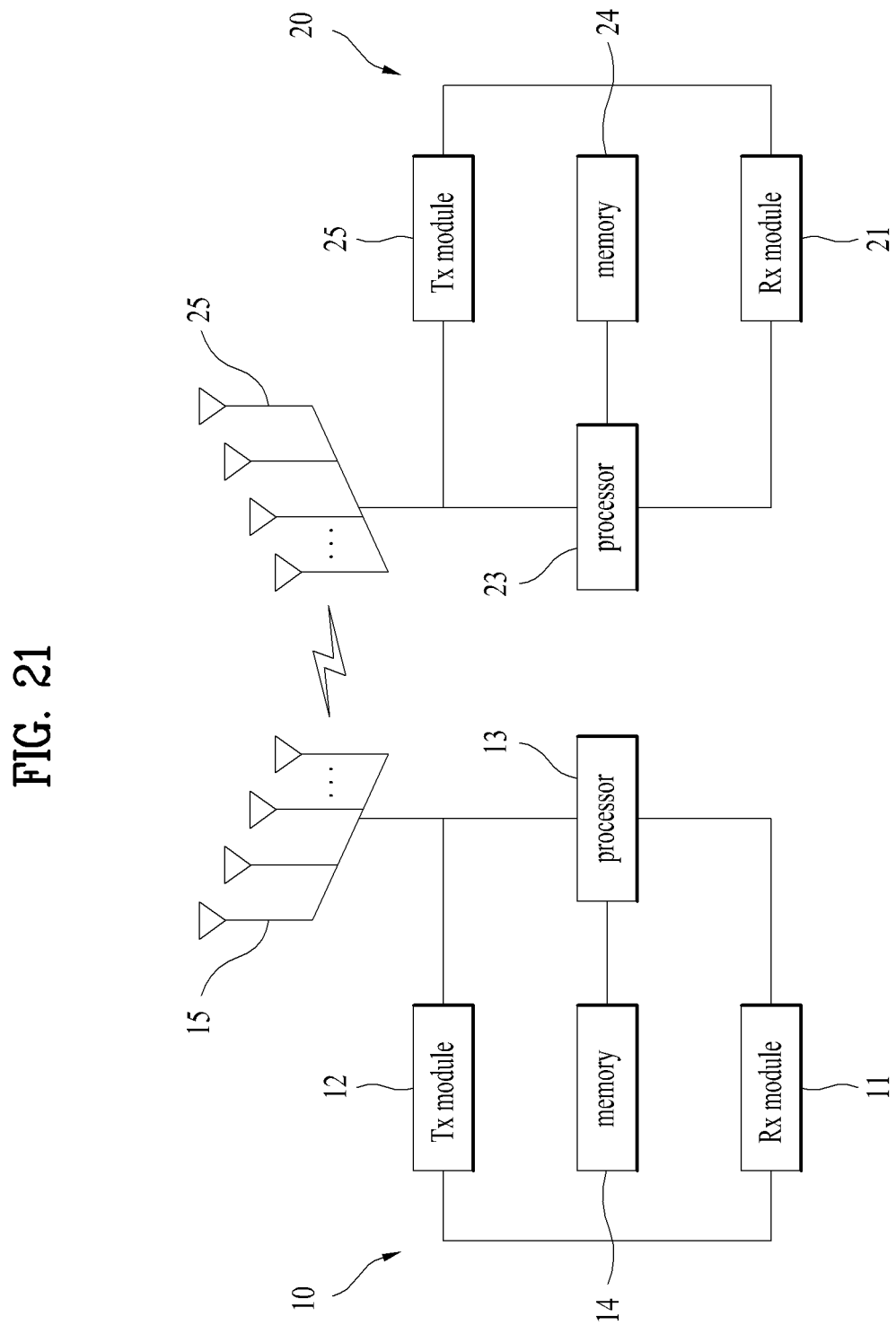
FIG. 21 is a diagram for a configuration of a preferred embodiment for a downlink transmission device and a downlink reception device according to the present invention.

FIG. 21 is a diagram for a configuration of a preferred embodiment for a downlink transmission device and a downlink reception device according to the present invention.

Referring to FIG. 21, a downlink transmission device 10 according to the present invention can include a reception module 11, a transmission module 12, a processor 13, a memory 14 and a plurality of antennas 15. A plurality of the antennas 15 indicate a downlink transmission device supporting MIMO transmission and reception. The reception module 11 can receive various signals, data and information on uplink from the downlink reception device 20. The transmission module 12 can transmit various signals, data and information on downlink to the downlink reception device 20. The processor 13 can control overall operation of the downlink transmission device 10.

The downlink transmission device 10 according to one embodiment of the present invention can be configured to transmit downlink control information to the downlink reception device 20. The processor 13 of the downlink transmission device 10 can be configured to construct an information element including information indicating downlink subframe set configuration information (e.g., bitmap) and a downlink control channel type (e.g., PDCCH or EPDCCH) for each downlink subframe set. The information element can further include information (e.g., information indicating EPDCCH start OFDM symbol position) indicating a resource position to which the downlink control channel is mapped in a specific downlink subframe set. The processor 13 can transmit the information element to the downlink reception device 20 using the transmission module 12.

And, the processor 13 can transmit a downlink control channel corresponding to a type transmitted in a specific subframe set to the downlink reception device 20 according to the information element using the transmission module 12.

Besides, the processor 13 of the downlink transmission device 10 performs a function of calculating information received by the downlink transmission device 10, information to be transmitted to external and the like. The memory 14 can store the calculated information for a prescribed time and the memory 14 can be replaced with such a component as a buffer (not depicted) and the like.

Referring to FIG. 21, a downlink reception device 20 according to the present invention can include a reception module 21, a transmission module 22, a processor 23, a memory 24 and a plurality of antennas 25. A plurality of the antennas 25 indicate a downlink reception device supporting MIMO transmission and reception. The reception module 21 can receive various signals, data and information on downlink from the downlink transmission device 10. The transmission module 22 can transmit various signals, data and information on uplink to the downlink transmission device 10. The processor 23 can control overall operation of the downlink reception device 20.

The downlink reception device 20 according to one embodiment of the present invention can be configured to receive downlink control information from the downlink transmission device 10. The processor 23 of the downlink reception device 20 can be configured to receive an information element including information indicating downlink subframe set configuration information (e.g., bitmap) and a downlink control channel type (e.g., PDCCH or EPDCCH) for each downlink subframe set using the reception module 21. The information element can further include information (e.g., information indicating EPDCCH start OFDM symbol position) indicating a resource position to which the downlink control channel is mapped in a specific downlink subframe set.

And, the processor 13 can be configured to monitor a downlink control channel corresponding to a downlink control channel type, which is indicated in response to a specific subframe set, on a determined resource position of a subframe belonging to the specific downlink subframe set. As a result of the monitoring, if the downlink control channel is detected, the processor 23 can receive downlink control information transmitted on the downlink control channel using the reception module 21.

And, the processor 23 can be configured to determine whether to monitor PHICH. For instance, in case of monitoring EPDCCH in a specific downlink subframe, whether to monitor PHICH in the specific downlink subframe can be determined based on whether the EPDCCH is overlapped with a PDCCH area, whether EPDCCH resource mapping position is included in the information element and whether an antenna port of a serving cell CRS is in QCL relation with a DMRS antenna port of EPDCCH.

Besides, the processor 23 of the downlink reception device 20 performs a function of calculating information received by the downlink reception device 20, information to be transmitted to external and the like. The memory 24 can store the calculated information for a prescribed time and the memory 24 can be replaced with such a component as a buffer (not depicted) and the like.

A concrete configuration of the aforementioned downlink transmission device 10 and the downlink reception device 20 can be implemented in a manner of independently applying the items mentioned earlier in various embodiments of the present invention or applying two or more embodiments at the same time. For clarity, explanation on duplicated contents is omitted at this time.

And, explanation on the downlink transmission device 10 in FIG. 21 can be applied to a base station. Or, the explanation on the downlink transmission device 10 can be identically applied to a relay device as a main entity of downlink transmission or a main entity of uplink reception. And, explanation on the downlink reception device 10 in FIG. 21 can be applied to a user equipment. Or, the explanation on the downlink reception device 10 can be identically applied to a relay device as a main entity of uplink transmission or a main entity of downlink reception.

The embodiments according to the present invention can be implemented by various means, for example, hardware, firmware, software, or their combination.

If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FRGAs), processors, controllers, microcontrollers, microprocessors, etc.

If the embodiment according to the present invention is implemented by firmware or software, the embodiment of the present invention may be implemented by a type of a module a procedure, or a function, which performs functions or operations described as above. A software code may be stored in a memory unit and then may be driven by a processor. The memory unit may be located inside or outside the processor to transmit and receive data to and from the processor through various means which are well known.

Various embodiments have been described in the best mode for carrying out the invention. The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The above-described embodiments of the present invention may be applied to various mobile communication system.

What is claimed is:

1. A method of receiving downlink control information at a user equipment in a wireless communication system, the method comprising:
  receiving an information element containing information used for setting a plurality of downlink subframe sets and information indicating a type of a downlink control channel for each of a plurality of the downlink subframe sets from a base station;
  determining a resource position to which the downlink control channel is mapped according to the type of the downlink control channel in a specific downlink subframe set;
  monitoring a control channel corresponding to the type of the downlink control channel in the resource position of a downlink subframe belonging to the specific downlink subframe set; and
  receiving the downlink control information transmitted on the monitored control channel,
  wherein a plurality of the downlink subframe sets are configured based on at least one of a cyclic prefix (CP) type of a subframe, whether a subframe corresponds to a multicast broadcast single frequency network (MBSFN) subframe, whether a subframe corresponds to a special subframe in time division duplex (TDD), the type of the downlink control channel, whether an enhanced physical downlink control channel (EPDCCH) is transmittable, and a start orthogonal frequency division multiplexing (OFDM) symbol position of an EPDCCH.

2. The method of claim 1, wherein the information indicating the type of the downlink control channel indicates one of a physical downlink control channel (PDCCH) and an EPDCCH.

3. The method of claim 1, wherein the information element further contains information indicating the resource position to which the downlink control channel is mapped.

4. The method of claim 3, wherein the information indicating the resource position to which the downlink control channel is mapped corresponds to information indicating a start OFDM symbol position of an EPDCCH.

5. The method of claim 1, wherein the resource position to which the downlink control channel is mapped is inferred from control format indicator (CFI) information transmitted on a physical control format indicator channel (PCFICH).

6. The method of claim 1, wherein if the type of the downlink control channel for the specific downlink subframe set indicates a physical downlink control channel (PDCCH), the information element does not comprise information indicating a resource position to which the downlink control channel is mapped.

7. The method of claim 1, wherein if the type of the downlink control channel for the specific downlink subframe set indicates an EPDCCH and the resource position to which the downlink control channel is mapped is overlapped with a physical downlink control channel (PDCCH) area, physical hybrid automatic repeat request indicator channel (PHICH) monitoring by the user equipment is not performed.

8. The method of claim 1, wherein if information indicating a start OFDM symbol position of an EPDCCH is contained in the information element, physical hybrid automatic repeat request indicator channel (PHICH) monitoring by the user equipment is not performed.

9. The method of claim 1, wherein when information indicating start OFDM symbol positions of a plurality of EPDCCHs is contained in the information element, if at least one of the start OFDM symbol positions of the plurality of the EPDCCHs is overlapped with a physical downlink control channel (PDCCH) area, physical hybrid automatic repeat request indicator channel (PHICH) monitoring by the user equipment is not performed.

10. The method of claim 1, wherein when the type of the downlink control channel for the specific downlink subframe set indicates an EPDCCH, and the resource position to which the downlink control channel is mapped is overlapped with a physical downlink control channel (PDCCH) area, if a demodulation reference signal (DMRS) antenna port used for demodulating the EPDCCH and a serving cell cell-specific reference signal (CRS) antenna port is indicated as quansi co-located (QCL), physical hybrid automatic repeat request indicator channel (PHICH) monitoring by the user equipment is not performed.

11. The method of claim 1, wherein when the type of the downlink control channel for the specific downlink subframe set indicates an EPDCCH, and the resource position to which the downlink control channel is mapped is overlapped with a physical downlink control channel (PDCCH) area, if a demodulation reference signal (DMRS) antenna port used for demodulating the EPDCCH and a serving cell cell-specific reference signal (CRS) antenna port is indicated as non-quansi co-located (non-QCL), physical hybrid automatic repeat request indicator channel (PHICH) monitoring by the user equipment is performed.

12. The method of claim 7, wherein the PDCCH area is inferred based on at least one of control format information (CFI) information transmitted on a physical control format indicator channel (PCFICH) and PHICH duration information.

13. The method of claim 1, wherein the information element is provided to the user equipment via radio resource control (RRC) signaling.

14. A user equipment for receiving downlink control information in a wireless communication system, the user equipment comprising:
a reception module; and
a processor configured to:
receive an information element containing information setting a plurality of downlink subframe sets and information indicating a type of a downlink control channel for each of a plurality of the downlink subframe sets from a base station using the reception module,
determine a resource position to which the downlink control channel is mapped according to the type of the downlink control channel in a specific downlink subframe set,
monitor a control channel corresponding to the type of the downlink control channel in the resource position of a downlink subframe belonging to the specific downlink subframe set, and
receive the downlink control information transmitted on the monitored control channel using the reception module,
wherein a plurality of the downlink subframe sets are configured based on at least one of a cyclic prefix (CP) type of a subframe, whether a subframe corresponds to a multicast broadcast single frequency network (MBSFN) subframe, whether a subframe corresponds to a special subframe in time division duplex (TDD), the type of the downlink control channel, whether an enhanced physical downlink control channel (EPDCCH) is transmittable, and a start orthogonal frequency division multiplexing (OFDM) symbol position of an EPDCCH.

* * * * *